(12) United States Patent
Sung et al.

(10) Patent No.: US 10,341,677 B2
(45) Date of Patent: Jul. 2, 2019

(54) METHOD AND APPARATUS FOR PROCESSING VIDEO SIGNALS USING INTER-VIEW INTER-PREDICTION

(71) Applicant: LG Electronics Inc., Seoul (KR)

(72) Inventors: Jaewon Sung, Seoul (KR); Sehoon Yea, Seoul (KR); Moonmo Koo, Seoul (KR); Jin Heo, Seoul (KR); Taesup Kim, Seoul (KR); Jiwook Jung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 675 days.

(21) Appl. No.: 14/400,214

(22) PCT Filed: May 9, 2013

(86) PCT No.: PCT/KR2013/004081
§ 371 (c)(1),
(2) Date: Nov. 10, 2014

(87) PCT Pub. No.: WO2013/169031
PCT Pub. Date: Nov. 14, 2013

(65) Prior Publication Data
US 2015/0098509 A1  Apr. 9, 2015

Related U.S. Application Data

(60) Provisional application No. 61/645,582, filed on May 10, 2012.

(51) Int. Cl.
*H04N 11/02* (2006.01)
*H04N 19/52* (2014.01)
(Continued)

(52) U.S. Cl.
CPC .......... *H04N 19/52* (2014.11); *H04N 19/109* (2014.11); *H04N 19/119* (2014.11);
(Continued)

(58) Field of Classification Search
CPC .. H04N 19/109; H04N 19/119; H04N 19/159; H04N 19/176; H04N 19/463; H04N 19/51; H04N 19/593; H04N 19/597
(Continued)

(56) References Cited

U.S. PATENT DOCUMENTS

2005/0220190 A1  10/2005  Ha et al.
2007/0064800 A1   3/2007  Ha
(Continued)

FOREIGN PATENT DOCUMENTS

JP   2005094803   4/2005
KR   100631777    10/2006
(Continued)

OTHER PUBLICATIONS

Gerhard Tech, et al.: "3D-HEVC Test Model 1", Joint Collaborative Team on 3D Video Coding Extension Development of ITU-T SG 16 WP 3 and ISO/IEC JTC 1/SS 29WG 11, 1st Meeting: Stockholm, SE, Jul. 16-20, 2012, (JCT3V-A1005 d0].
(Continued)

*Primary Examiner* — Jayanti K Patel
*Assistant Examiner* — Richard B Carter
(74) *Attorney, Agent, or Firm* — Dentons US LLP

(57) ABSTRACT

A method for processing video signals by a decoding apparatus includes determining whether the temporal neighboring block of a current texture block is coded using inter-view prediction; and determining whether the spatial neighboring block of the current texture block is coded using inter-view prediction. When the temporal neighboring block and the spatial neighboring block are not coded using the
(Continued)

inter-view prediction, deriving an inter-view motion vector of the current texture block as a disparity vector, and performing inter-view prediction for the current texture block using the derived inter-view motion vector of the current texture block. The disparity vector is obtained using a depth value according the current texture block.

14 Claims, 12 Drawing Sheets

(51) Int. Cl.
    *H04N 19/597*     (2014.01)
    *H04N 19/109*     (2014.01)
    *H04N 19/119*     (2014.01)
    *H04N 19/159*     (2014.01)
    *H04N 19/176*     (2014.01)
    *H04N 19/593*     (2014.01)
    *H04N 19/51*     (2014.01)
    *H04N 19/463*     (2014.01)

(52) U.S. Cl.
    CPC ......... *H04N 19/159* (2014.11); *H04N 19/176* (2014.11); *H04N 19/463* (2014.11); *H04N 19/51* (2014.11); *H04N 19/593* (2014.11); *H04N 19/597* (2014.11)

(58) Field of Classification Search
    USPC .................................................. 375/240.16
    See application file for complete search history.

(56) References Cited

U.S. PATENT DOCUMENTS

| | | | | |
|---|---|---|---|---|
| 2010/0322311 | A1* | 12/2010 | Vetro ................... | H04N 19/597 375/240.12 |
| 2013/0176390 | A1* | 7/2013 | Chen .................... | H04N 19/597 348/43 |
| 2013/0272412 | A1* | 10/2013 | Seregin ............ | H04N 19/00763 375/240.16 |
| 2014/0294088 | A1* | 10/2014 | Sung .................... | H04N 19/597 375/240.16 |

FOREIGN PATENT DOCUMENTS

| | | |
|---|---|---|
| KR | 10-2008-0008944 A | 1/2008 |
| KR | 2008-0015760 A | 2/2008 |
| KR | 10-2008-0047944 A | 5/2008 |
| KR | 1020090116655 | 11/2009 |
| KR | 1020110071047 | 6/2011 |
| KR | 1020110113583 | 10/2011 |
| WO | 2013103879 A1 | 7/2013 |

OTHER PUBLICATIONS

Gerhard Tech, et al.: "3D-HEVC Test Model 3", Joint Collaborative Team on 3D Video Coding Extension Development of ITU-T SG 6 WP 3 and ISO/IEC JTC 1/SC 29/WG 11, 3rd Meeting: Geneva, CH, Jan. 17-23, 2013, (JCT3V-C1005_do] (version 2).

Konieczny J et al: "Depth-based inter-view motion data prediction for HEVC-based multiview video coding", 2012 Picture Coding Symposium (PCS 2012): Krakow, Poland, May 7-9, 2012 ; [Proceedings], IEEE, Piscataway, NJ, May 7, 2012 (May 7, 2012), pp. 33-36, XP032449822, DOI: 10.1109/PCS.2012.6213279, ISBN: 978-1-4577-2047-5.

Li Zhang et al: "3D-CE5.h related: Disparity vector derivation for multiview video and 3DV", 100. MPEG Meeting; Apr. 30, 2012-Apr. 5, 2012; Geneva; (Motion Picture Expert Group or ISO/IEC JTC1/SC29/WG11),, No. m24937, May 1, 2012 (May 1, 2012), XP030053280.

Schwarz H et al: "Inter-view prediction of motion data in multiview video coding", Karakow, Poland, May 7-9, 2012; [Proceedings], IEEE, Piscataway, NJ, May 7, 2012 (May 7, 2012), pp. 101-104,XP032449839, DOI: 10.1109/PCS.2012.6213296 ISBN: 978-1-4577-2047-5.

Heiko Schwarz et al: "Description of 3D Video Coding Technology Proposal by Fraunhofer HHI (HEVC compatible, configuration A)", 93. MPEG Meeting; Nov. 28, 2011-Feb. 12, 2011; Geneva; (Motion Picture Expert Group or ISO/IEC JTC1/SC29/WG11),, No. m22570, Nov. 22, 2011 (Nov. 22, 2011), XP030051133.

Lee Jye tal: "3D-CE5.h related results on inter-view motion vector candidate construction in merge and AMVP modes", 2. JCT-3V Meeting; 102. MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://phenix.int.evry.fr/jct2/,, No. JCT3V-B0158, Oct. 9, 2012 (Oct. 9, 2012), XP030130339.

* cited by examiner (a)  (b)

FIG. 5
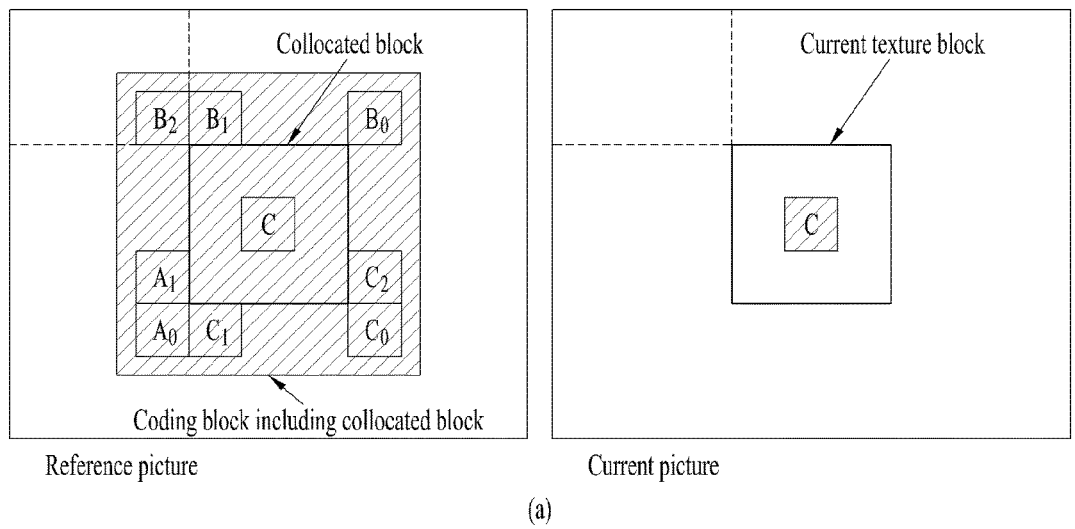
(a)
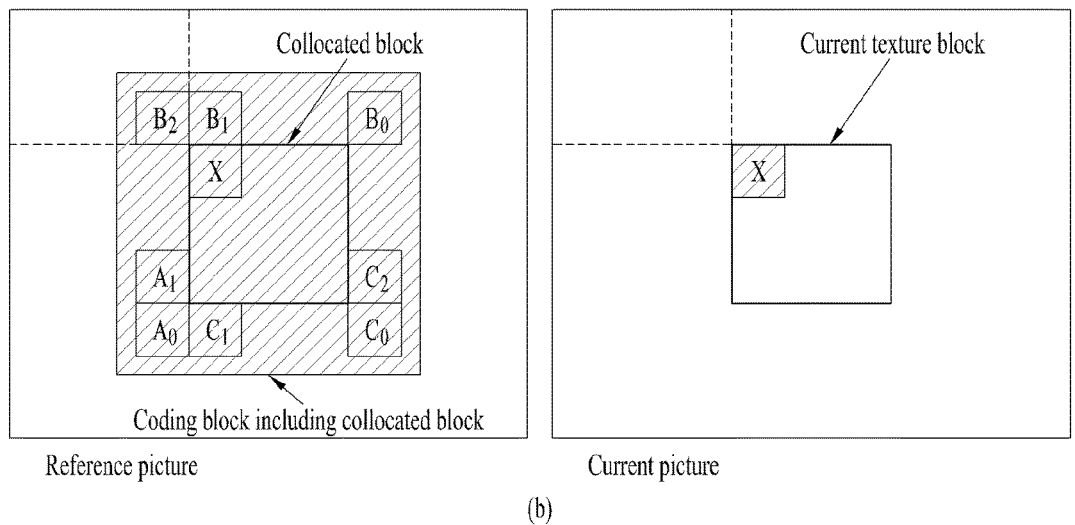
(b)

(a)                              (b)

METHOD AND APPARATUS FOR PROCESSING VIDEO SIGNALS USING INTER-VIEW INTER-PREDICTION

This application is a 35 USC § 371 National Stage entry of International Application No. PCT/KR2013/004081 filed on May 9, 2013, and claims priority of U.S. Provisional Application No. 61/645,582 filed on May 10, 2012, each of which is hereby incorporated by reference in its entirety.

TECHNICAL FIELD

The present invention relates to a method and apparatus for processing video signals.

BACKGROUND ART

Compression refers to a signal processing technique for transmitting digital information through a communication line or storing the digital information in a form suitable for a storage medium. Subjects of compression include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention derives an inter-view motion vector of a current texture block on the basis of at least one of an inter-view motion vector of a spatial/temporal neighboring block and a disparity vector.

The present invention derives the inter-view motion vector in consideration of priorities of candidates including at least one of the spatial/temporal neighboring block and the disparity vector.

Spatial neighboring blocks according to the present invention include at least one of a left lower neighboring block, a left neighboring block, a right upper neighboring block, an upper neighboring block and a left upper neighboring block of the current texture block, and a spatial inter-view motion vector is acquired by searching the spatial neighboring blocks for a block coded according to inter-view inter-prediction in consideration of priorities of the spatial neighboring blocks.

Temporal neighboring blocks according to the present invention include at least one of a collocated block, a neighboring block adjacent to the collocated block and a coding block including the collocated block, and a temporal inter-view motion vector is acquired by searching the temporal neighboring blocks for a block coded according to inter-view inter-prediction in consideration of priorities of the temporal neighboring blocks.

The present invention acquires a disparity vector of a current picture using a disparity vector map and, simultaneously, modifies a disparity vector stored in the disparity vector map using a disparity vector offset.

The present invention sets fixed priorities of inter-view motion vector candidates and derives the inter-view motion vector of the current texture block from the inter-view motion vector candidates according to the fixed priorities.

The present invention uses, as candidates, an inter-view motion vector of a block coded according to temporal inter-prediction as well as an inter-view motion vector of a block coded according to inter-view inter-prediction from among spatial/temporal neighboring blocks.

The present invention defines a plurality of priority tables and selectively uses the priority tables on the basis of priority table indexes.

The present invention determines priorities of inter-view motion vector candidates of a currently coded block on the basis of a state variable of a previously coded block.

Advantageous Effects

The present invention can improve video data prediction accuracy using correlation between views by performing inter-view inter-prediction using an inter-view motion vector. In addition, a precise inter-view motion vector can be derived by selectively using an inter-view motion vector or a disparity vector of a spatial/temporal neighboring block as the inter-view motion vector so as to improve inter-view inter-prediction accuracy, and coding efficiency can be enhanced by reducing the amount of transmitted residual data. Furthermore, an inter-view motion vector corresponding to a reference view motion vector is used as a candidate even in the case of a block coded according to temporal inter-prediction as well as a block coded according to inter-view inter-prediction from among spatial/temporal neighboring blocks, thereby predicting an accurate inter-view motion vector. Moreover, priority is determined for a plurality of inter-view motion vector candidates and blocks, which are coded according to inter-view inter-prediction, are sequentially searched according to the priority, thereby reducing complexity of a process of deriving an inter-view motion vector.

DESCRIPTION OF DRAWINGS

FIG. 5 illustrates exemplary temporal neighboring blocks according to an embodiment to which the present invention is applied.

BEST MODE

Figure 1:
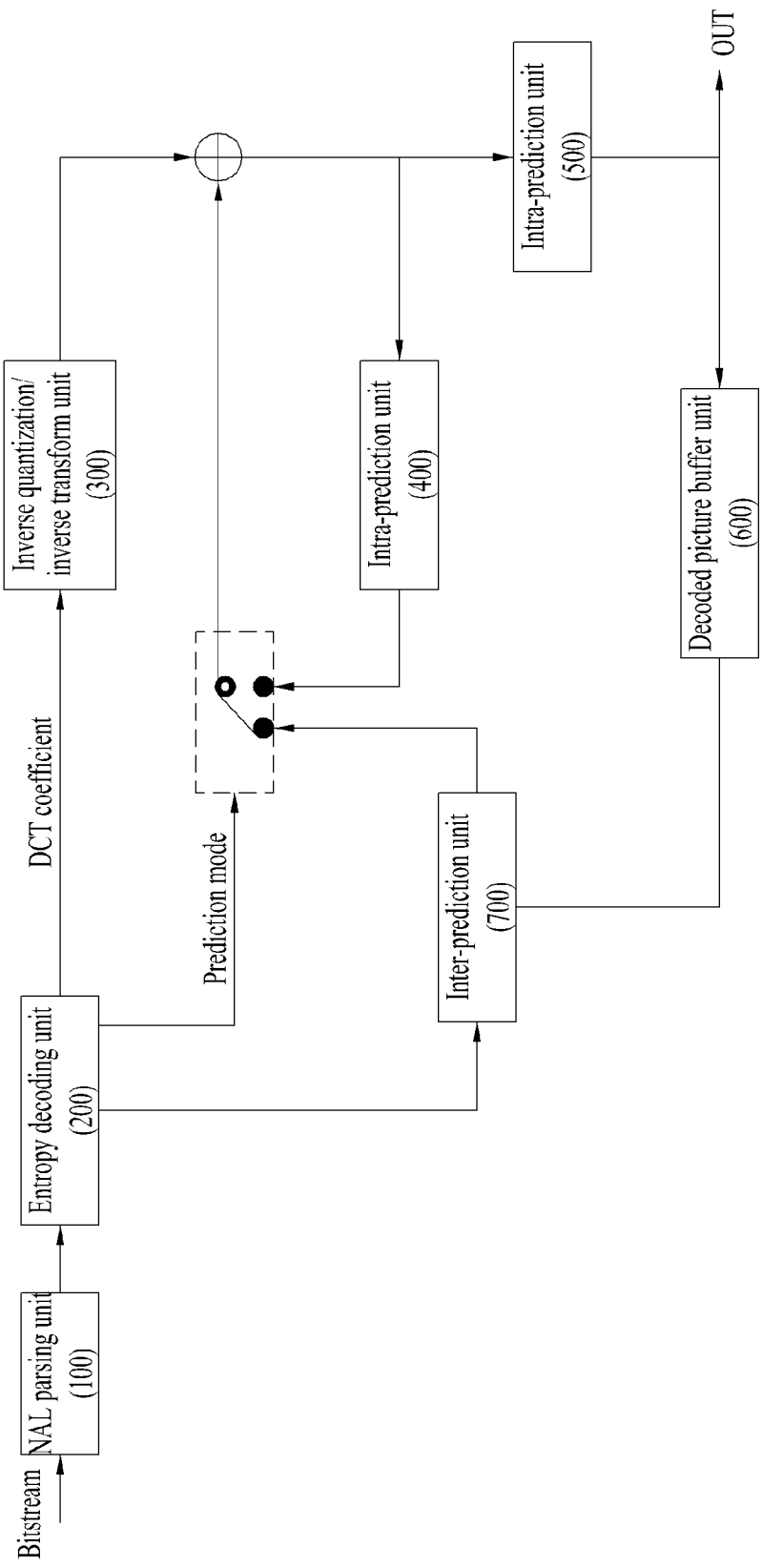
FIG. 1 is a block diagram of a video decoder according to an embodiment to which the present invention is applied.

To accomplish the object of the present invention, there is provided a method for processing video signals, including: deriving an inter-view motion vector of a current texture block from one of inter-view motion vector candidates of the current texture block in consideration of priorities of the inter-view motion vector candidates; and performing inter-view inter-prediction for the current texture block using the derived inter-view motion vector.

According to the present invention, the inter-view motion vector of the spatial neighboring block may have a priority higher than that of the inter-view motion vector of the temporal neighboring block, and the inter-view motion vector of the temporal neighboring block may have higher priority than that of the disparity vector.

According to the present invention, the method may further include: detecting a block coded according to inter-view inter-prediction for the spatial neighboring block having highest priority; deriving the inter-view motion vector of the current texture block from the inter-view motion vector of the spatial neighboring block when the block coded according to inter-view inter-prediction is present; and detecting a block coded according to inter-view inter-prediction for the temporal neighboring block having next highest priority when the block coded according to inter-view inter-prediction is not present.

According to the present invention, the spatial neighboring block may include at least one of a left lower neighboring block, a left neighboring block, a right upper neighboring block, an upper neighboring block and a left upper neighboring block of the current texture block.

According to the present invention, the block coded according to inter-view inter-prediction may be detected on the basis of priorities of the spatial neighboring blocks, wherein the spatial neighboring blocks have priorities in descending order of the left lower neighboring block, left neighboring block, right upper neighboring block, upper neighboring block and left upper neighboring block.

According to the present invention, the temporal neighboring block may include at least one of a collocated block, a block adjacent to the collocated block and a coding block including the collocated block.

According to the present invention, the block coded according to inter-view inter-prediction may be detected on the basis of priorities of the temporal neighboring blocks, wherein the temporal neighboring blocks have priorities in descending order of the collocated block, the block adjacent to the collocated block and the coding block including the collocated block.

Modes for Invention

Techniques of compressing or decoding multiview video signal data consider spatial redundancy, temporal redundancy and inter-view redundancy. In the case of a multiview image, multiview texture images captured at two or more viewpoints can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted in the technical spirit and technical scope of the present invention.

FIG. 1 is a block diagram of a video decoder according to an embodiment to which the present invention is applied.

Referring to FIG. 1, the video decoder may include a NAC parsing unit 100, an entropy decoding unit 200, an inverse quantization/inverse transform unit 300, an intra-prediction unit 400, an in-loop filter unit 500, a decoded picture buffer unit 600 and an inter-prediction unit 700. The NAL parsing unit 100 may receive a bitstream including multiview texture data. In addition, the NAL parsing unit 100 may further receive a bitstream including encoded depth data when the depth data is necessary for texture data coding. The input texture data and depth data may be transmitted as one bitstream or transmitted as separate bitstreams. The NAL parsing unit 100 may perform parsing on an NAL basis in order to decode the input bitstream. When the input bitstream is multiview related data (e.g. 3-dimensional video), the input bitstream may further include a camera parameter. The camera parameter may include an intrinsic camera parameter and an extrinsic camera parameter, and the intrinsic camera parameter may include a focal length, an aspect ratio, a principal point and the like and the extrinsic camera parameter may include camera position information in the global coordinate system and the like.

The entropy decoding unit 200 may extract a quantized transform coefficient, coding information for texture picture prediction and the like through entropy decoding. The inverse quantization/inverse transform unit 300 may acquire a transform coefficient by applying a quantization parameter to the quantized transform coefficient and decode the texture data or the depth data by inversely transforming the transform coefficient. Here, the decoded texture data or depth data may include residual data according to prediction. In addition, a quantization parameter for a depth block may be set in consideration of complexity of the texture data. For example, a low quantization parameter can be set when a texture block corresponding to the depth block has a high complexity and a high quantization parameter can be set when the texture block has a low complexity. The complexity of the texture block may be determined on the basis of a differential value between neighboring pixels in a reconstructed texture picture, as represented by Equation 1.

$$E = \frac{1}{N} \sum_{(x,y)} [|C_{x,y} - C_{x-1,y}| + |C_{x,y} - C_{x+1,y}|]^2 \qquad \text{[Equation 1]}$$

In Equation 1, E denotes the complexity of texture data, C denotes reconstructed texture data and N denotes the number of pixels in a texture data region for which complexity will be calculated. Referring to Equation 1, the complexity of texture data can be calculated using a differential value between texture data corresponding to the point (x, y) and texture data corresponding to the point (x−1, y) and a differential value between the texture data corresponding to the point (x, y) and texture data corresponding to the point (x+1, y). In addition, complexity can be calculated for each of the texture picture and texture block and the quantization parameter can be derived using the complexity, as represented by Equation 2.

$$\Delta QP = \min\left(\max\left(\alpha \log_2 \frac{E_f}{E_b}, -\beta\right), \beta\right) \qquad \text{[Equation 2]}$$

Referring to Equation 2, the quantization parameter for the depth block can be determined on the basis of the ratio of the complexity of the texture picture to the complexity of the texture block. In Equation 2, $\alpha$ and $\beta$ may be variable integers derived by the decoder or may be integers predetermined in the decoder.

The intra-prediction unit 400 may perform intra-prediction using reconstructed texture data in the current texture picture. Intra-prediction may be performed for the depth picture in the same manner as that for the texture picture. For example, coding information used for inter-prediction of the texture picture can be equally used for the depth picture. The coding information used for inter-prediction may include an intra-prediction mode and partition information of intra-prediction.

The in-loop filter unit 500 may apply an in-loop filter to each coded block in order to reduce block distortion. The filter may smooth the edge of a block so as to improve the quality of a decoded picture. Filtered texture pictures or depth pictures may be output or stored in the decoded picture buffer unit 600 to be used as reference pictures. When texture data and depth data are coded using the same in-loop filter, coding efficiency may be deteriorated since the texture data and the depth data have different characteristics. Accordingly, a separate in-loop filter for the depth data may be defined. A description will be given of a region-based adaptive loop filter and a trilateral loop filter as an in-loop filtering method capable of efficiently coding the depth data.

In the case of the region-based adaptive loop filter, it can be determined whether the region-based adaptive loop filter is applied on the basis of a variance of a depth block. The variance of the depth block can be defined as a difference between a maximum pixel value and a minimum pixel value in the depth block. It is possible to determine whether the filter is applied by comparing the variance of the depth block with a predetermined threshold value. For example, when the variance of the depth block is greater than or equal to the predetermined threshold value, which means that the difference between the maximum pixel value and the minimum pixel value in the depth block is large, it can be determined that the region-based adaptive loop filter is applied. On the contrary, when the variance of the depth block is less than the predetermined threshold value, it can be determined that the region-based adaptive loop filter is not applied. When the region-based adaptive loop filter is applied according to the comparison result, pixel values of the filtered depth block may be derived by applying a predetermined weight to neighboring pixel values. Here, the predetermined weight can be determined on the basis of a position difference between a currently filtered pixel and a neighboring pixel and/or a differential value between a currently filtered pixel value and a neighboring pixel value. The neighboring pixel value may refer to one of pixel values other than the currently filtered pixel value from among pixel values included in the depth block.

The trilateral loop filter according to the present invention is similar to the region-based adaptive loop filter but is distinguished from the region-based adaptive loop filter in that the former additionally considers texture data. Specifically, the trilateral loop filter can extract depth data of neighboring pixels which satisfy the following three conditions.

| $|p-q| \leq \sigma 1$ | Condition 1. |

| $|D(p)-D(q)| \leq \sigma 2$ | Condition 2. |

| $|V(p)-V(q)| \leq \sigma 3$ | Condition 3. |

Condition 1 compares a position difference between a current pixel p and a neighboring pixel q in the depth block with a predetermined parameter $\sigma 1$, Condition 2 compares a difference between depth data of the current pixel p and depth data of the neighboring pixel q with a predetermined parameter $\sigma 2$ and Condition 3 compares a difference between texture data of the current pixel p and texture data of the neighboring pixel q with a predetermined parameter $\sigma 3$.

The trilateral loop filter can extract neighboring pixels which satisfy the three conditions and filter the current pixel p with the median or average of depth data of the neighboring pixels.

The decoded picture buffer unit 600 may store or open previously coded texture pictures or depth pictures in order to perform inter-prediction. To store previously coded texture pictures or depth pictures in the decoded picture buffer unit 600 or to open the pictures, frame_num and a picture order count (POC) of each picture may be used. Furthermore, since the previously coded pictures include depth pictures corresponding to viewpoints different from the viewpoint of the current depth picture in depth coding, viewpoint identification information for identifying a depth picture viewpoint may be used in order to use the depth pictures corresponding to different viewpoints as reference pictures. The decoded picture buffer unit 600 may manage reference pictures using an adaptive memory management control operation method and a sliding window method in order to achieve inter-prediction more flexibly. This enables a reference picture memory and a non-reference picture memory to be united into one memory so as to achieve efficient management of a small memory. In depth coding, depth pictures may be marked to be discriminated from texture pictures in the decoded picture buffer unit and information for identifying each depth picture may be used during the marking process.

The inter-prediction unit 700 may perform motion compensation of a current block using reference pictures and motion information stored in the decoded picture buffer unit

600. The motion information may include a motion vector and reference index information in a broad sense in the specification. In addition, the inter-prediction unit 700 may perform temporal inter-prediction for motion compensation. Temporal inter-prediction may refer to inter-prediction using reference pictures, which correspond to the same viewpoint as the current texture block while corresponding to a time period different from that of the current texture block, and motion information of the current texture block. In the case of a multiview image captured by a plurality of cameras, inter-view inter-prediction may be performed in addition to temporal inter-prediction. Inter-view inter-prediction may refer to inter-prediction using reference pictures corresponding to viewpoints different from that of the current texture block and motion information of the current texture block. For convenience, motion information used for inter-view prediction is referred to as an inter-view motion vector and inter-view reference index information. Accordingly, motion information can be flexibly interpreted as information including the inter-view motion vector and inter-view reference index information in the specification. A description will be given of a method for deriving motion information of the current texture block, particularly, a motion vector in the inter-prediction unit 700.

Figure 2:
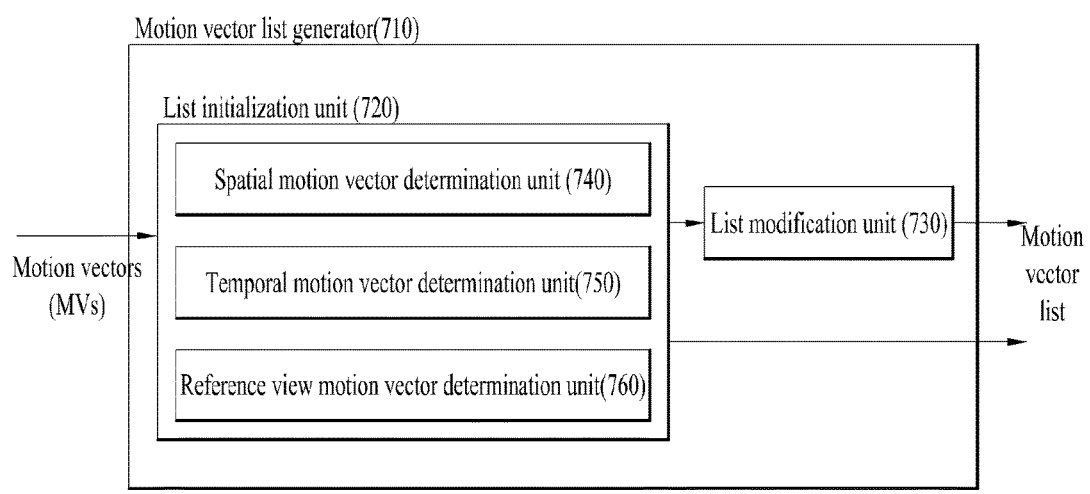
FIG. 2 illustrates a configuration of a motion vector list generator 710 according to an embodiment to which the present invention is applied.

FIG. 2 illustrates a configuration of a motion vector list generator 710 according to an embodiment to which the present invention is applied.

The motion vector list generator 710 may be included in the inter-prediction unit 700 of the decoder. The motion vector list generator 710 may be composed of a list initialization unit 720 and a list modification unit 730. The list initialization unit 720 may generate a motion vector list including motion vector candidates. Here, the motion vector candidates may refer to a set of motion vectors of the current texture block or motion vectors which can be used as predicted motion vectors. A motion vector candidate according to the present invention may include at least one of a spatial motion vector, a temporal motion vector and a reference view motion vector. The spatial motion vector, the temporal motion vector and the reference view motion vector included in the motion vector candidate are respectively acquired by a spatial motion vector determination unit 740, a temporal motion vector determination unit 750 and a reference view motion vector determination unit 760, which are included in the motion vector list initialization unit 720. The spatial motion vector determination unit 740 may derive a spatial motion vector from a motion vector of a neighboring block which is spatially adjacent to the current texture block. A method of determining the spatial motion vector will be described in detail with reference to FIG. 3. The temporal motion vector determination unit 750 may derive a temporal motion vector from a motion vector of a neighboring block which is temporally adjacent to the current texture block. For example, the temporally adjacent neighboring block may correspond to a collocated block, which is in the same position as the current texture block within a reference picture corresponding to the same viewpoint as that of the current texture block and located in a time period different from that of the current texture block. Here, the reference picture can be specified by reference index information of a picture including the collocated block. The reference view motion vector determination unit 760 may derive a reference view motion vector from a motion vector of a corresponding block positioned at a viewpoint different from the current texture block. Here, the corresponding block may be a block indicated by an inter-view motion vector of the current texture block. For example, a reference block within a reference view can be specified using the inter-view motion vector of the current texture block and the motion vector of the specified reference block can be set as the reference view motion vector of the current texture block. The inter-view motion vector used to determine the reference view motion vector may be included in the motion vector candidate of the current texture block to form the motion vector list. In this case, the inter-view motion vector may be included in the motion vector list in consideration of whether the reference picture of the current texture block corresponds to the same view as the current texture block or a different view. For example, when the reference picture of the current texture block corresponds to a view different from the current texture block, the inter-view motion vector can be added to the motion vector list. Otherwise, when the reference index information of the current texture block indicates a reference picture for inter-view prediction, the inter-view motion vector may be added to the motion vector list. A method of deriving the inter-view motion vector according to the present invention will be described with reference to FIGS. 4 to 13.

The motion vector list generated by the list initialization unit 720 may be used as a final motion vector list for deriving the motion vector of the current texture block and may be modified through the list modification unit 730 to remove redundancy of motion vector candidates. For example, the list modification unit 730 can check whether spatial motion vectors in the motion vector list generated by the list initialization unit 720 are identical. When identical spatial motion vectors are present, the list modification unit 730 may remove one of the identical spatial motion vectors from the motion vector list. Furthermore, when the number of motion vector candidates, which are left in the motion vector list after removal of redundancy of motion vector candidates in the motion vector list, is less than 2, the list modification unit 730 may add a zero motion vector. On the contrary, when the number of motion vector candidates, which are left in the motion vector list after removal of redundancy of motion vector candidates, is greater than 2, the list modification unit 730 may remove motion vector candidates except for 2 motion vector candidates from the motion vector list. Here, the 2 motion vector candidates left in the motion vector list may be candidates having lower list identification indexes in the motion vector list. A list identification index, which is allocated to each motion vector candidate included in the motion vector list, may refer to information for identifying each motion vector candidate.

Figure 3:
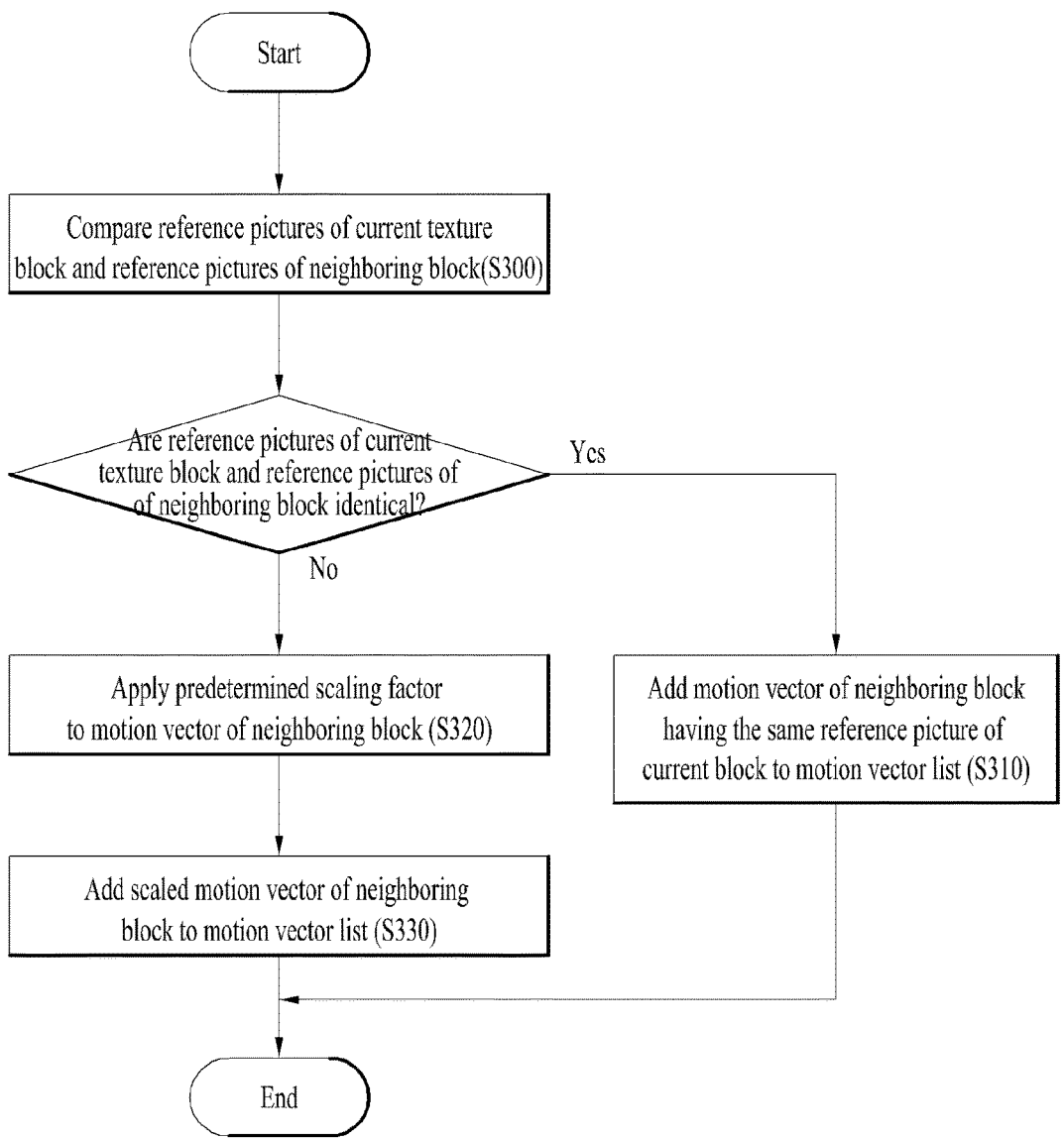
FIG. 3 is a flowchart illustrating a process of determining a spatial motion vector according to an embodiment to which the present invention is applied.

FIG. 3 illustrates a process of determining a spatial motion vector according to an embodiment to which the present invention is applied.

The spatial motion vector according to the present invention may be derived from a motion vector of a neighboring block which is spatially adjacent to the current texture block. The neighboring block which is spatially adjacent to the current texture block may refer to one of blocks located at the left, top, lower left, upper left and upper right of the current texture block. In determination of the spatial motion vector, it may be checked whether reference pictures of the current texture block and the neighboring block are identical to each other (S300). For example, it is possible to check whether reference index information of the current texture block corresponds to reference index information of the neighboring block in order to determine whether the reference pictures of the current texture block and the neighboring block are identical to each other. Alternatively, it may be checked whether picture order count (POC) information allocated to the reference picture of the current texture block corresponds to POC information allocated to the reference picture of the neighboring block. Even when reference picture lists used by the current texture picture and the neighboring block differ from each other, it is possible to check whether the reference pictures of the current texture block and the neighboring block are identical to each other by comparing POC information allocated to the reference picture of the current texture block with POC information allocated to the reference picture of the neighboring block since POC information is information indicating a picture output sequence or time sequence and an output sequence is a unique value of each picture. A process of checking whether the reference pictures are identical may be performed on two groups of spatially neighboring blocks. For example, left and left lower neighboring blocks of the current texture block can be grouped into a first group and upper, left upper and right upper neighboring blocks of the current texture block can be grouped into a second group. In this case, it can be checked whether the reference picture of the current texture block corresponds to the reference picture of at least one neighboring block included in the first block and whether the reference picture of the current texture block corresponds to the reference picture of at least one neighboring block included in the second block. The reference picture of the current texture block may be compared with reference pictures of neighboring blocks in a predetermined order. For example, in the case of the first group, the reference picture of the current texture block can be sequentially compared with the reference picture of the left lower neighboring block and the reference picture of the left neighboring block. In the case of the second group, the reference picture of the current texture block can be sequentially compared with the reference picture of the right upper neighboring block, the reference picture of the upper neighboring block and the reference picture of the left upper neighboring block. When it is determined that the reference picture of the current texture block is identical to the reference picture of the neighboring block in step S300, the motion vector of the neighboring block having the same reference picture may be added to the motion vector list (S310). When it is determined that the reference picture of the current texture block is not identical to the reference picture of the neighboring block, a predetermined scaling factor may be applied to the motion vector of the neighboring block (S320). The scaling factor may be determined in consideration of a temporal distance between the current picture including the current texture block and the reference picture of the current texture block. For example, the scaling factor can be determined in consideration of a differential value between POC information allocated to the current picture and POC information allocated to the reference picture of the current texture block. In addition, a temporal distance between the current picture and the reference picture of the neighboring block may be further considered to determine the scaling factor. For example, the scaling factor can be determined in consideration of a differential value between the POC information allocated to the current picture and POC information allocated to the reference picture of the neighboring block. The scaled motion vector of the neighboring block may be added to the motion vector list (S330).

The method of generating a motion vector list has been described with reference to FIGS. 2 and 3. A description will be given of a method of deriving the motion vector of the current texture block from the motion vector list in the inter-prediction unit 700.

Motion vector identification information about the current texture block may be extracted from an input bitstream. The motion vector identification information may be information that specifies a motion vector candidate used as a motion vector or a predicted motion vector of the current texture block. That is, a motion vector candidate corresponding to the extracted motion vector identification information may be extracted from the motion vector list and set to the motion vector or predicted motion vector of the current texture block. When the motion vector candidate corresponding to the motion vector identification information is set to a predicted motion vector of the current texture block, a motion vector differential value may be used to reconstruct the motion vector of the current texture block. Here, the motion vector differential value may refer to a differential vector between the decoded motion vector and the predicted motion vector. Accordingly, the motion vector of the current texture block can be decoded using the predicted motion vector acquired from the motion vector list and the motion vector differential value extracted from the bitstream. Pixel values of the current texture block may be predicted using the decoded motion vector and a reference picture list. The reference picture list may include not only reference pictures for temporal inter-prediction but also reference pictures for inter-view inter-prediction.

The inter-view motion vector described with reference to FIG. 2 may be derived from one selected from a spatial inter-view motion vector, a temporal inter-view motion vector and a disparity vector. The spatial inter-view motion vector according to the present invention may be derived from a motion vector of a neighboring block which is coded according to inter-view inter-prediction from among spatial neighboring blocks of the current texture block. In other words, the spatial inter-view motion vector may be derived using a neighboring block having an inter-view motion vector from among spatial neighboring blocks of the current texture block, which will be described with reference to FIG. 4. The temporal inter-view motion vector of the present invention may be derived from a motion vector of a neighboring block which is coded according to inter-view inter-prediction from among temporal neighboring blocks of the current texture block. In other words, the temporal inter-view motion vector may be derived using a neighboring block having an inter-view motion vector from among temporal neighboring blocks of the current texture block. Here, a temporal neighboring block may refer to a block in the same position as the current texture block or adjacent to the position of the current texture block within a reference picture having the same view as the current picture including the current texture block, which will be described with reference to FIG. 5. The disparity vector according to the present invention may represent inter-view disparity in a multiview image. In the case of a multiview image, inter-view disparity according to camera position may be generated and the disparity vector may compensate for the inter-view disparity. A method of deriving the disparity vector will be described with reference to FIG. 6.

Figure 4:
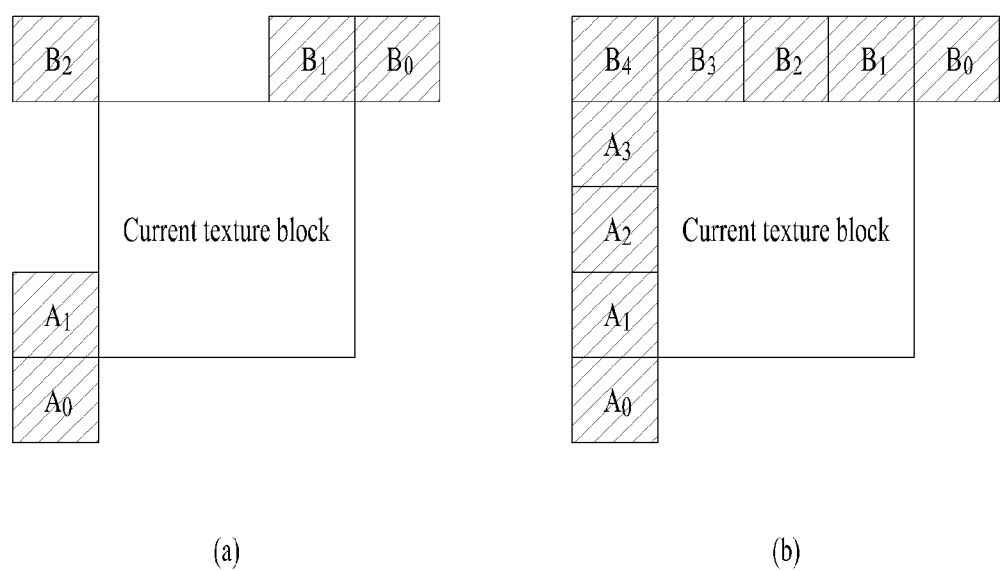
FIG. 4 illustrates exemplary spatial neighboring blocks according to an embodiment to which the present invention is applied.

FIG. 4 illustrates exemplary spatial neighboring blocks according to an embodiment to which the present invention is applied.

Referring to FIG. 4(*a*), spatial neighboring blocks may include at least one of a left lower neighboring block $A_0$, a left neighboring block $A_1$, a right upper neighboring block $B_0$, an upper neighboring block $B_1$ and a left upper neighboring block $B_2$. The aforementioned spatial neighboring blocks may be searched for a block coded according to inter-view inter-prediction and an inter-view motion vector of the neighboring block coded according to inter-view inter-prediction may be set to an inter-view motion vector of the current texture block. The block coded according to inter-view inter-prediction may be detected in consideration of priorities of the spatial neighboring blocks. It is assumed that the priorities of the spatial neighboring blocks are set as shown in Table 1 when the block coded according to inter-view inter-prediction is detected.

TABLE 1

| Priority | Spatial neighboring block |
|---|---|
| 0 | Left lower neighboring block |
| 1 | Left neighboring block |
| 2 | Right upper neighboring block |
| 3 | Upper neighboring block |
| 4 | Left upper neighboring block |

Referring to Table 1, a lower priority value refers to a higher priority. Accordingly, the spatial neighboring blocks may be searched in the order of the left lower neighboring block, left neighboring block, right upper neighboring block, upper neighboring block and left upper neighboring block for a block coded according to inter-view inter-prediction. For example, when the left lower neighboring block is a block coded according to inter-view inter-prediction, the inter-view motion vector of the left lower neighboring block can be set to the inter-view motion vector of the current texture block and searching can be ended. However, when the left lower neighboring block has not been coded according to inter-view inter-prediction, it can be checked whether the left neighboring block has been coded according to inter-view inter-prediction. Alternatively, the spatial neighboring blocks may be searched in the order of the left neighboring block, upper neighboring block, right upper neighboring block, left lower neighboring block and left upper neighboring block for a block coded according to inter-view inter-prediction. However, priorities of the spatial neighboring blocks are not limited to the above-described embodiment.

A description will be given of a method for determining whether a neighboring block is coded according to inter-view inter-prediction. In one embodiment, it is possible to determine whether a neighboring block is coded according to inter-view inter-prediction on the basis of whether the corresponding neighboring block uses an inter-view reference picture list. The inter-view reference picture list may refer to a list composed of reference pictures positioned at viewpoints different from the viewpoint of the corresponding neighboring block. Alternatively, it may be determined whether a neighboring block is coded according to inter-view inter-prediction on the basis of reference index information of the corresponding neighboring block. For example, when the reference index information of the corresponding neighboring block specifies a reference picture located at a viewpoint different from that of the corresponding neighboring block, it can be specified that the corresponding neighboring block is coded according to inter-view inter-prediction. Alternatively, it may be determined whether a neighboring block is coded according to inter-view inter-prediction on the basis of whether POC of a picture including the corresponding neighboring block is identical to POC of a reference picture of the corresponding neighboring block. POC is output sequence information and pictures in the same access unit may have the same POC. Accordingly, when the two POCs are identical, this means that the picture including the corresponding neighboring block and the reference picture are located at different viewpoints. In this case, it can be specified that the corresponding neighboring block is coded according to inter-view inter-prediction.

FIG. 4(b) illustrates an expansion of spatial neighboring block candidates. When the size of the left neighboring block $A_1$ is less than the size of the current texture block, the current texture block may further have at least one left neighboring block. For example, the spatial neighboring blocks according to the present invention can further include left neighboring blocks $A_2$ and $A_3$ located between the left neighboring block $A_1$ and the left upper neighboring block $B_4$, as shown in FIG. 4(b). In the same manner, the spatial neighboring blocks according to the present invention can further include upper neighboring blocks $B_2$ and $B_3$ located between the upper neighboring block $B_1$ and the left upper neighboring block $B_4$ when the size of the upper neighboring block $B_1$ is less than the size of the current texture block. In this case, a block coded according to inter-view inter-prediction may also be detected in consideration of priorities of the spatial neighboring blocks (e.g. $A_0 \rightarrow A_1 \rightarrow A_2 \rightarrow A_3 \rightarrow B_0 \rightarrow B_1 \rightarrow B_2 \rightarrow B_3 \rightarrow B_4$). As described above, it is possible to increase the probability that the inter-view motion vector of the current texture block can be acquired by expanding spatial neighboring block candidates for deriving the inter-view motion vector of the current texture block.

FIG. 5 illustrates exemplary temporal neighboring blocks according to an embodiment to which the present invention is applied.

Referring to FIG. 5, a temporal neighboring block may refer to a block (referred to as a collocated block hereinafter) in the same position as the current texture block within a reference picture of the current texture block. Here, the reference picture may refer to a picture corresponding to the same view as the current picture including the current texture block while corresponding to a different time. The collocated block according to the present invention may be defined through two methods, as shown in FIG. 5. Referring to FIG. 5(a), the collocated block may be defined as a block including the position C in the reference picture, which corresponds to the position C of the center pixel of the current texture block. Referring to FIG. 5(b), the collocated block may be defined as a block including the position X in the reference picture, which corresponds to the position X of the left upper pixel of the current texture block.

The temporal neighboring block of the present invention is not limited to the collocated block and may refer to a neighboring block adjacent to the collocated block. As shown in FIG. 5(a), at least one of the left lower neighboring block $A_0$, left block $A_1$, right upper neighboring block $B_0$, upper block $B_1$ and left upper neighboring block $B_2$ may be used as the neighboring block adjacent to the collocated block. Furthermore, since the reference picture has been decoded prior to the current picture, a lower neighboring block and a right neighboring block of the collocated block may also be used as temporal neighboring blocks. For example, a right lower neighboring block $C_0$, a lower neighboring block $C_1$ and a right neighboring block $C_2$ can be used as temporal neighboring blocks, as shown in FIG. 5(a).

Figure 6:
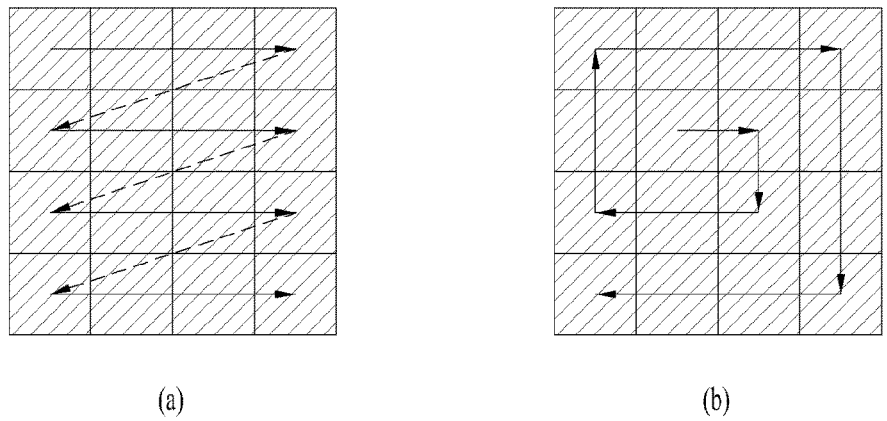
FIG. 6 illustrates priorities of blocks included in a coding block including a collocated block when the coding block is used as a temporal neighboring block according to an embodiment to which the present invention is applied.

In addition, the temporal neighboring block according to the present invention may refer to a coding block including a collocated block. A coding block may refer to a basic unit for processing an image in a video signal processing procedure (e.g. intra/inter-prediction, transform, quantization, entropy coding and the like). One coding block may be segmented into a plurality of coding blocks. For example, a 2N×2N coding block can be divided into four N×N coding blocks. Coding block segmentation may be recursively performed. When a temporal neighboring block is defined as a coding block including a collocated block, an inter-view motion vector of a block coded according to inter-view inter-prediction, which is included in the corresponding coding block, may be an inter-view motion vector candidate of the current texture block. In this case, the block coded according to inter-view inter-prediction may be detected in consideration of priorities of blocks included in the corresponding coding block, which is now be described with reference to FIG. 6. FIG. 6 illustrates priorities of blocks belonging to a coding block including a collocated block when the coding block is used as a temporal neighboring block according to an embodiment to which the present invention is applied.

Referring to FIG. 6(a), priorities of blocks included in a coding block may be determined according to raster scanning order. Raster scanning may refer to line scanning from the left to the right. Accordingly, when neighboring blocks are searched in raster scanning order for a block coded according to inter-view inter-prediction and the block coded according to inter-view inter-prediction is detected, the inter-view motion vector of the corresponding block may be set as the inter-view motion vector of the current texture block. Referring to FIG. 6(b), the priorities may be determined in clockwise or counter-clockwise scanning order from an inside block to an outside block in the coding block.

It is possible to search a) a collocated block, b) a neighboring block adjacent to the collocated block and c) a coding block including the collocated block, which are regarded as temporal neighboring block candidates, for a block coded according to inter-view inter-prediction in consideration of priority. Specifically, it is determined whether a temporal neighboring block with highest priority is a block coded according to inter-view inter-prediction and, when the temporal neighboring block with the highest priority has not been coded according to inter-view inter-prediction, it is determined whether a temporal neighboring block with next highest priority is a block coded according to inter-view inter-prediction. This operation may be performed until a block coded according to inter-view inter-prediction is detected. For example, priorities of temporal neighboring blocks are assumed as shown in Table 2. The priorities shown in Table 2 are exemplary and the present invention is not limited thereto.

TABLE 2

| Priority | Temporal neighboring block |
| --- | --- |
| 0 | Collocated block |
| 1 | Neighboring block adjacent to the collocated block |
| 2 | Coding block including the collocated block |

Referring to Table 2, a lower priority value refers to a higher priority. Accordingly, it may be determined whether the collocated block with highest priority is a block coded according to inter-view inter-prediction. When the collocated block with the highest priority is a block coded according to inter-view inter-prediction, the inter-view motion vector of the collocated block may be set as the inter-view motion vector of the current texture block and searching may be stopped. However, when the collocated block with the highest priority is not a block coded according to inter-view inter-prediction, searching is performed in the order of the neighboring block adjacent to the collocated block and the coding block including the collocated block until a block coded according to inter-view inter-prediction is found.

When the inter-view motion vector of the current texture block is derived, a temporal neighboring block may be selectively used on the basis of temporal motion flag information. The temporal motion flag information may refer to information that specifies whether the temporal neighboring block is used when the motion vector or inter-view motion vector of the current picture is derived. That is, an encoder can code the temporal motion flag information into 1 when it is efficient to use the inter-view motion vector of the temporal neighboring block as an inter-view motion vector candidate of the current picture and code the temporal motion flag information into 0 otherwise and transmit the temporal motion flag information to a decoder. The decoder may use the temporal neighboring block as an inter-view motion vector candidate when deriving an inter-view motion vector of each texture block included in the current picture only when the temporal neighboring block is used, according to the temporal motion flag information about the current picture. Access to coding information of the reference picture can be limited by enabling restricted use of the temporal neighboring block using the temporal motion flag information, thereby reducing decoding complexity and the number of times of referring to a memory storing the reference picture. A description will be given of a method of acquiring a disparity vector which can be used as the inter-view motion vector of the current texture block.

Figure 7:
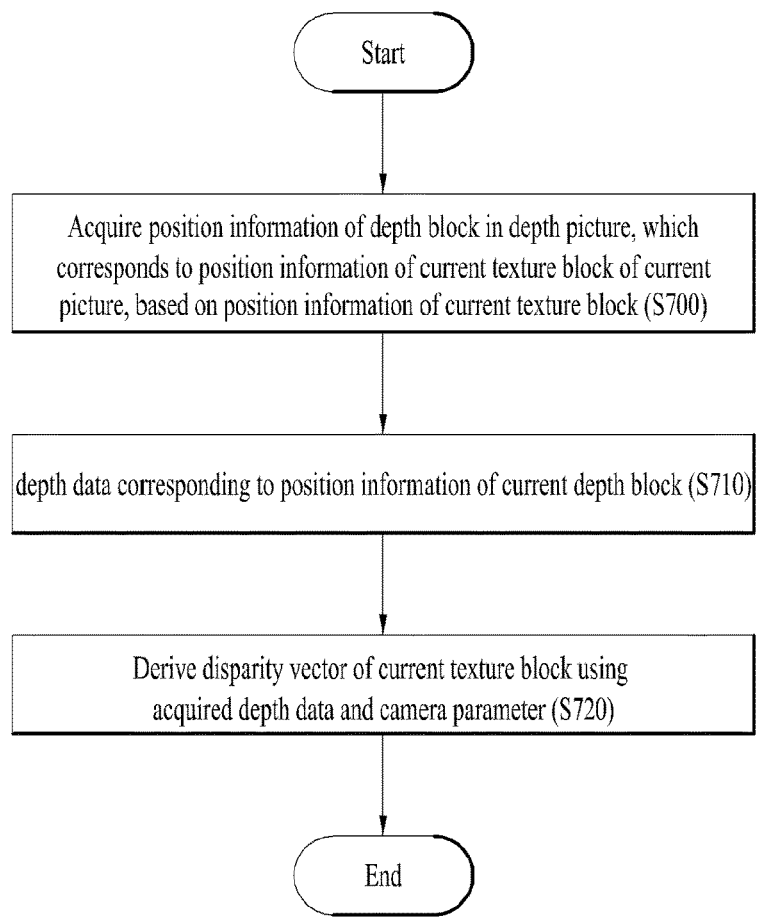
FIG. 7 is a flowchart illustrating a method for deriving a disparity vector of a current texture block using depth data according to an embodiment to which the present invention is applied.

FIG. 7 is a flowchart illustrating a method of deriving a disparity vector of the current texture block using depth data according to an embodiment to which the present invention is applied.

Referring to FIG. 7, position information of a depth block (referred to as a current depth block hereinafter) in a depth picture, which corresponds to the current texture block of the current picture, may be acquired on the basis of position information of the current texture block of the current picture (S700). The position of the current depth block may be determined in consideration of spatial resolutions of the depth picture and the current picture. For example, when the depth picture and the current picture are coded in the same spatial resolution, the position of the current depth block can be determined as the same position as the current texture block of the current picture. The current picture and the depth picture may be coded in different spatial resolutions since coding efficiency is not remarkably deteriorated even when depth information is coded in decreased spatial resolution in terms of characteristics of the depth information indicating a distance between a camera and an object. Accordingly, when the depth picture is coded in spatial resolution lower than that of the current picture, the decoder may upsample the depth picture prior to acquisition of the position information of the current depth block. In addition, when the aspect ratio of the upsampled depth picture is not consistent with the aspect ratio of the current picture, offset information may be additionally considered when the position information of the current depth block is acquired within the upsampled depth picture. Here, the offset information may include at least one of upper offset information, left offset information, right offset information and lower offset information. The upper offset information may refer to a position difference between at least one pixel located at the top of the upsampled depth picture and at least one pixel located at the top of the current picture. The left offset information, right offset information and lower offset information may be defined in the same manner.

Depth data corresponding to the position information of the current depth block may be acquired (S710). When the current depth block includes a plurality of pixels, depth data corresponding to a corner pixel of the current depth block may be used. Otherwise, depth data corresponding to a center pixel of the current depth block may be used. Alternatively, one of a maximum value, minimum value and mode, from among a plurality of pieces of depth data corresponding to the plurality of pixels, may be selectively used and a mean of the plurality of pieces of depth data may be used. The disparity vector of the current texture block may be derived using the acquired depth data and a camera parameter (S720). A detailed method of deriving the disparity vector of the current texture block will now be described with reference to Equations 3 and 4.

$$Z = \frac{1}{\frac{D}{255} \times \left(\frac{1}{Z_{near}} - \frac{1}{Z_{far}}\right) + \frac{1}{Z_{far}}}$$ [Equation 3]

In Equation 3, Z denotes a distance between a corresponding pixel and a camera, D is a value obtained by quantizing Z and corresponds to depth data of the present invention, and $Z_{near}$ and $Z_{far}$ respectively represent a minimum value and a maximum value of Z defined for a view including the depth picture. $Z_{near}$ and $Z_{far}$ may be extracted from a bitstream through a sequence parameter set, a slice header and the like and may be information predetermined in the decoder. Accordingly, when the distance between the corresponding pixel and the camera is quantized at a level of 256, Z can be reconstructed using depth data $Z_{near}$ and $Z_{far}$ as represented by Equation 3. Subsequently, the disparity vector for the current texture block may be derived using reconstructed Z, as represented by Equation 4.

$$d = \frac{f \times B}{Z}$$ [Equation 4]

In Equation 4, f denotes the focal length of a camera and B denotes a distance between cameras. It can be assumed that all cameras have the same f and B, and thus f and B may be information predefined in the decoder.

When only texture data of a multiview image is coded, information about camera parameters cannot be used and thus the method of deriving a disparity vector from depth data cannot be used. Accordingly, a disparity vector map storing disparity vectors may be used when only texture data of a multiview image is coded. The disparity vector map may be a map in which disparity vectors, each of which is composed of horizontal components and vertical components, are stored in a two-dimensional array. The disparity vector map of the present invention may be represented in various sizes. For example, the disparity vector map can have a size of 1×1 when only one disparity vector is used per picture. When a disparity vector is used per 4×4 block in a picture, the disparity vector map can have a size corresponding to 1/16 of the picture size since the disparity vector map has a width and a height of ¼ of those of the picture. In addition, the size of the current texture block may be adaptively determined in one picture and a disparity vector may be stored per corresponding texture block.

The current picture may be decoded using a disparity vector extracted from a disparity vector map corresponding thereto. The disparity vector map corresponding to the current picture may be updated on the basis of a current picture decoding result. The updated disparity vector map may be used as a disparity vector map of a picture coded after the current picture. A description will be given of a method of updating a disparity vector map with reference to FIG. 8.

Figure 8:
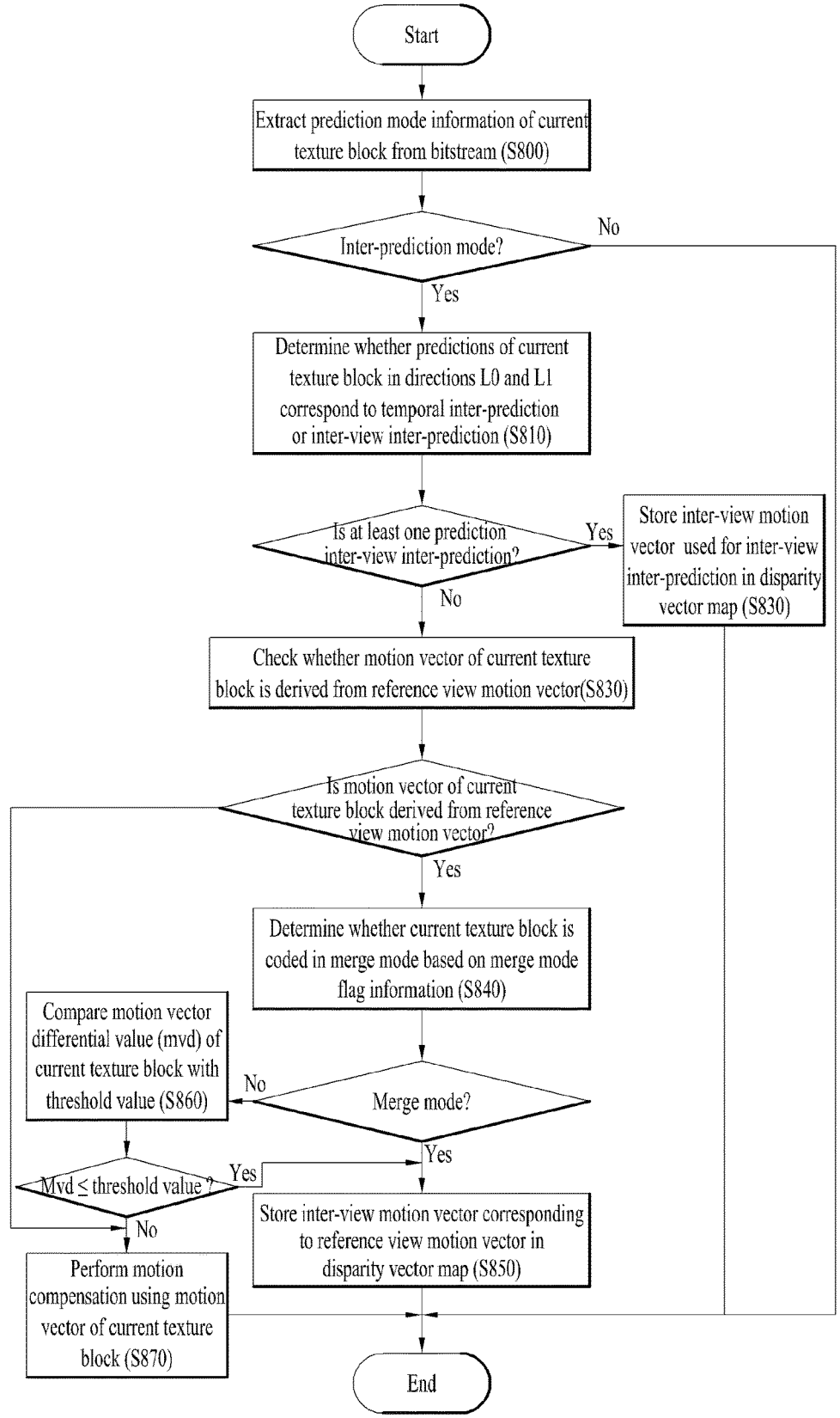
FIG. 8 is a flowchart illustrating a process of updating a disparity vector map for an inter-predicted block in a current picture according to an embodiment to which the present invention is applied.

FIG. 8 is a flowchart illustrating a process of updating a disparity vector map for an inter-predicted block in the current picture according to an embodiment to which the present invention is applied.

Referring to FIG. 8, prediction mode information of the current texture block may be extracted from a bitstream (S800). The prediction mode information may refer to information indicating whether the current block is coded according to intra-prediction or inter-prediction. When the current texture block is coded through inter-prediction according to the extracted prediction mode information, it may be determined whether prediction of the current texture block in direction L0 and direction L1 is temporal inter-prediction or inter-view inter-prediction (S810). Prediction in direction L0 may refer to prediction using reference picture list 0 for inter-prediction in one direction and prediction in direction L1 may refer to prediction using reference picture list 1 between reference picture lists 0 and 1 for bi-directional inter-prediction. It is possible to use a) a method of using an inter-view reference picture list, b) a method of using reference index information and c) a method of using identity of POC of a picture including the current texture block and POC of a reference picture of the current texture block may be used as a method for determining whether the current texture block is coded according to inter-view inter-prediction. The methods have been described with reference to FIG. 4. When at least one of prediction of the current texture block in direction L0 and prediction of the current texture block in direction L1 is inter-view inter-prediction, an inter-view motion vector used for inter-view inter-prediction may be stored in the disparity vector map (S820). When both prediction in direction L0 and prediction in direction L1 correspond to inter-view inter-prediction, a mean value of two inter-view motion vectors used for inter-view inter-prediction may be stored in the disparity vector map. Otherwise, only horizontal components of the inter-view motion vectors used for inter-view inter-prediction may be stored in the disparity vector map. On the other hand, when any one of prediction of the current texture block in direction L0 and prediction of the current texture block in direction L1 does not correspond to inter-view inter-prediction, it may be checked whether the motion vector of the current texture block is derived from a reference view motion vector (S830). The reference view motion vector may refer to a motion vector used by a block specified by the inter-view motion vector of the current texture block, as described above. When the motion vector of the current texture block is derived from the reference view motion vector, it may be determined whether the current texture block is coded in a merge mode based on merge mode flag information (S840). The merging mode flag information indicates whether a corresponding block is coded in the merge mode and the merging mode refers to a mode in which a motion vector of a corresponding block is derived from one of a spatial motion vector, a temporal motion vector, a reference view motion vector and an inter-view motion vector and does not include a motion vector differential value. A non-merge mode refers to a mode in which a motion vector of a corresponding block is derived from one of a spatial motion vector, a temporal motion vector, and a reference view motion vector but includes a motion vector differential value for motion vector reconstruction since the derived motion vector is used as a predicted motion vector.

When it is determined that the current texture block is coded in the merge mode, an inter-view motion vector corresponding to the reference view motion vector may be stored in the disparity vector map (S850). When it is determined that the current texture block is not coded in the merge mode, the motion vector differential value of the current texture block may be compared with a threshold value (S860). The threshold value according to the present invention may be set to a predetermined integer. For example, a threshold value of a vertical component can be set to 2 pixels and a threshold value of a horizontal component can be set to 2 pixels. When the motion vector differential value is less than the threshold value, the inter-view motion vector corresponding to the reference view motion vector may be stored in the disparity vector map (S850). However, when the motion vector differential value is greater than the threshold value, motion compensation may be performed on the disparity vector map using the motion vector of the current texture block (S870). That is, a disparity vector specified by the motion vector of the current texture block may be extracted from the disparity vector map of the reference picture and stored in the disparity vector map of the current picture.

When the motion vector of the current texture block is not derived from the reference view motion vector in step S830, motion compensation may be performed on the disparity vector map using the motion vector of the current texture block so as to update the disparity vector map of the current picture (S850).

The encoder may extract a disparity vector having highest frequency from among disparity vectors stored in the disparity vector map, calculate a disparity vector offset with respect to the disparity vector and transmit the disparity vector offset to the decoder. The decoder may extract a disparity vector having highest frequency from among disparity vectors stored in the disparity vector map and modify the extracted disparity vector using the disparity vector offset acquired from a bitstream.

Alternatively, the encoder may extract K disparity vectors in order of frequency from a disparity vector having the highest frequency from among disparity vectors stored in the disparity vector map, calculate with respect to each extracted disparity vector and transmit the disparity vector offset to the decoder. In addition, the encoder may code offset count information which indicates the number of disparity vector offsets transmitted to the decoder and transmit the coded offset count information to the decoder. Accordingly, the decoder may extract the offset count information from a bitstream and extract as many disparity vector offsets as the offset count according to the offset count information from the bitstream. In addition, the decoder may extract as many disparity vectors as the offset count according to the offset count information in order of frequency from the disparity vector having the highest frequency. Then, the decoder may apply the disparity vector offsets to the extracted disparity vectors so as to modify the disparity vectors.

Alternatively, the encoder may extract a maximum value and a minimum value from among disparity vectors stored in the disparity vector map and calculate the range of the disparity vectors stored in the disparity vector map using the maximum value and the minimum value. In addition, the encoder may divide the range of the disparity vectors into N sections, code a disparity vector offset corresponding to each section and transmit the disparity vector offset to the decoder. Furthermore, the encoder may decode information on the number of the sections and transmit the information to the decoder. Accordingly, the decoder may extract the information on the number of the sections from a received bitstream and extract as many disparity vector offsets as the number of the sections according to the information. Then, the decoder may add a disparity vector offset with respect to a corresponding section to a disparity vector belonging to the corresponding section so as to modify the disparity vector.

The aforementioned method of modifying K disparity vectors having modes and the method of modifying disparity vectors by dividing a disparity vector range into N sections may be selectively used. To this end, it is possible to define offset type information which indicates modification of K disparity vectors having modes or modification of disparity vectors for N sections. Accordingly, K disparity vectors having modes may be extracted and disparity vector offsets may be applied to the K disparity vectors according to the offset type information. Otherwise, a disparity vector range may be divided into N sections and a disparity vector of a corresponding section may be modified using a disparity vector offset corresponding to the section according to the offset type information.

Inter-view motion vector candidates of the current text block may include a spatial inter-view motion vector, a temporal inter-view motion vector and a disparity vector and an inter-view motion vector of the current texture block may be derived from one selected from the spatial inter-view motion vector, temporal inter-view motion vector and disparity vector, as described above. A description will be given of a method of deriving the inter-view motion vector of the current texture block from inter-view motion vector candidates.

The inter-view motion vector may be acquired in consideration of priorities of inter-view motion vector candidates of the current texture block. The priorities of the inter-view motion vector candidates may be set, as shown in Table 3.

TABLE 3

| Priority | Category |
| --- | --- |
| 0 | Spatial inter-view motion vector |
| 1 | Temporal inter-view motion vector |
| 2 | Disparity vector |

In Table 3, a lower priority value refers to a higher priority. That is, the spatial inter-view motion vector may have highest priority and the temporal inter-view motion vector and the disparity vector may have the following priorities. A description will be given of a method of deriving an inter-view motion vector when the priories of the inter-view motion vector candidates are set, as shown in Table 3, with reference to FIG. 9. Table 3 is exemplary and the present invention is not limited thereto. For example, the priorities can be set in the order of the temporal inter-view motion vector, spatial inter-view motion vector and disparity vector or in the order of the disparity vector, spatial inter-view motion vector and temporal inter-view motion vector. Alternatively, the priorities may be set in a specific category. For example, priorities of the spatial inter-view motion vector and temporal inter-view motion vector can be set or priorities of the spatial inter-view motion vector and disparity vector.

Figure 9:
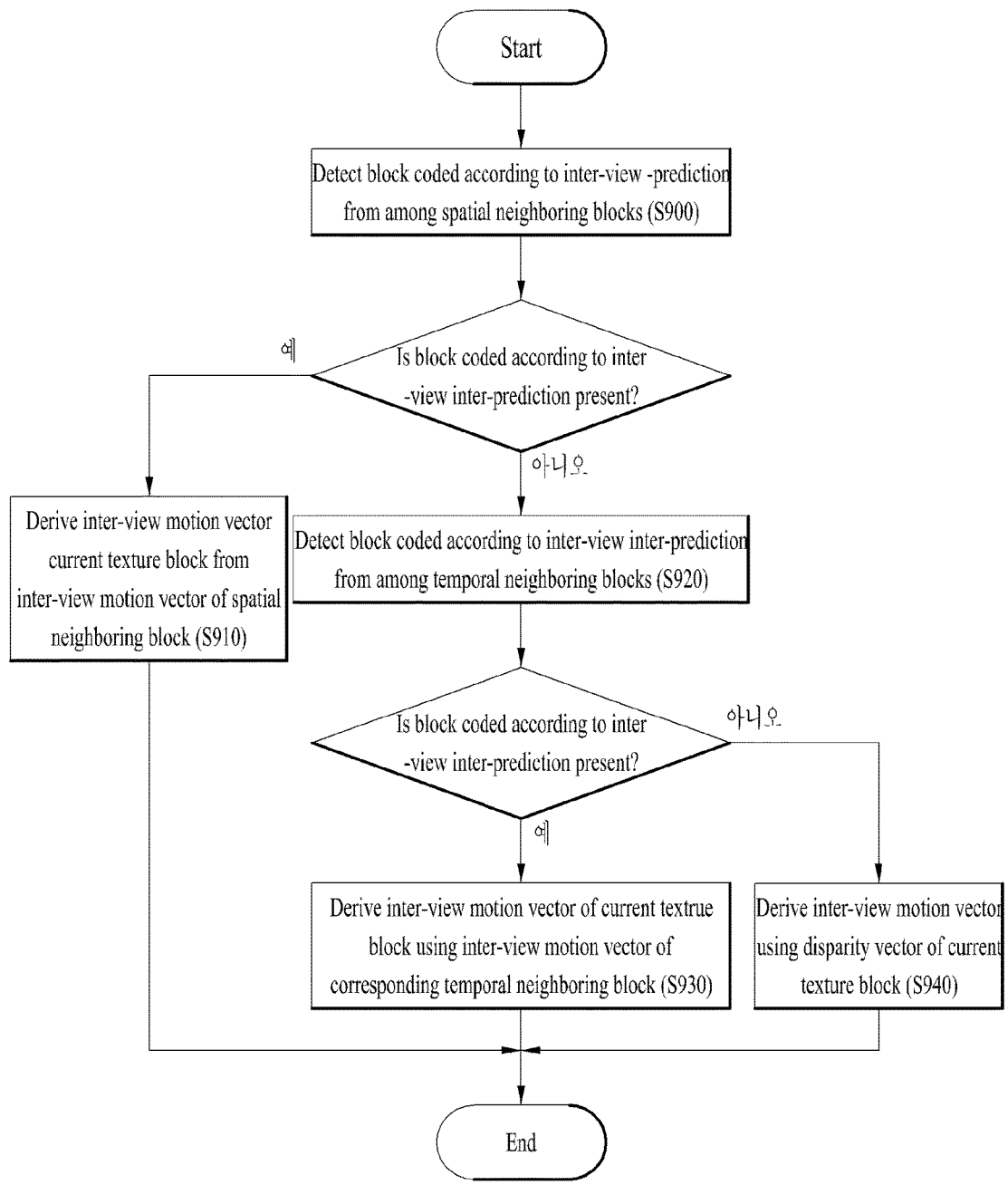
FIG. 9 is a flowchart illustrating a method of deriving an inter-view motion vector from a neighboring block coded according to inter-view inter-prediction on the basis of predetermined priority according to an embodiment to which the present invention is applied.

FIG. 9 illustrates a method of deriving an inter-view motion vector from a neighboring block coded according to inter-view inter-prediction on the basis of predetermined priorities according to an embodiment to which the present invention is applied.

Referring to FIG. 9, spatial neighboring blocks may be searched for a block coded according to inter-view inter-prediction (S900). As described with reference to FIG. 4, priorities of the spatial neighboring blocks may be considered when the spatial neighboring blocks are searched for a block coded according to inter-view inter-prediction. For example, a left lower neighboring block, a left neighboring block, a right upper neighboring block, an upper neighboring block and a left upper neighboring block can be sequentially searched for a block coded according to inter-view inter-prediction. In addition, a) the method of using an inter-view reference picture list, b) the method of using reference index information and c) the method of using identity of POC of a picture including a spatial neighboring block and POC of a reference picture of the spatial neighboring block may be used as a method of determining whether a block is coded according to inter-view inter-prediction. This has been described with reference to FIG. 4 and can be equally applied to the present embodiment and thus detailed description is omitted.

When the spatial neighboring blocks include a block coded according to inter-view inter-prediction, the inter-view motion vector of the current texture block may be derived from the inter-view motion vector of the corresponding spatial neighboring block (S910). On the contrary, when the spatial neighboring blocks do not include a block coded according to inter-view inter-prediction, temporal neighboring blocks may be searched for a block coded according to inter-view inter-prediction (S920). Temporal neighboring block candidates may include at least one of a) a collocated block, b) a block adjacent to a collocated block and c) a coding block including a collocated block, and the temporal neighboring blocks may be searched for a block coded according to inter-view inter-prediction in consideration of priorities of the temporal neighboring block candidates, as described above.

When the temporal neighboring blocks include a block coded according to inter-view inter-prediction, the inter-view motion vector of the current texture block may be derived using the inter-view inter-prediction of the corresponding temporal neighboring block (S930). On the contrary, when the temporal neighboring blocks do not include a block coded according to inter-view inter-prediction, the inter-view motion vector of the current texture block may be derived using a disparity vector of the current texture block (S940).

When spatial or temporal neighboring blocks are not coded according to inter-view inter-prediction, that is, when motion vectors of neighboring blocks are derived from reference view motion vectors even if the neighboring blocks are coded according to temporal inter-prediction, inter-view motion vectors corresponding to the reference view motion vectors may be used as inter-view motion vector candidates of the current texture block. A description will be given of a method of deriving an inter-view motion vector using a neighboring block coded according to temporal inter-prediction on the assumption that inter-view motion vector candidates have priorities as shown in Table 3.

Figure 10:
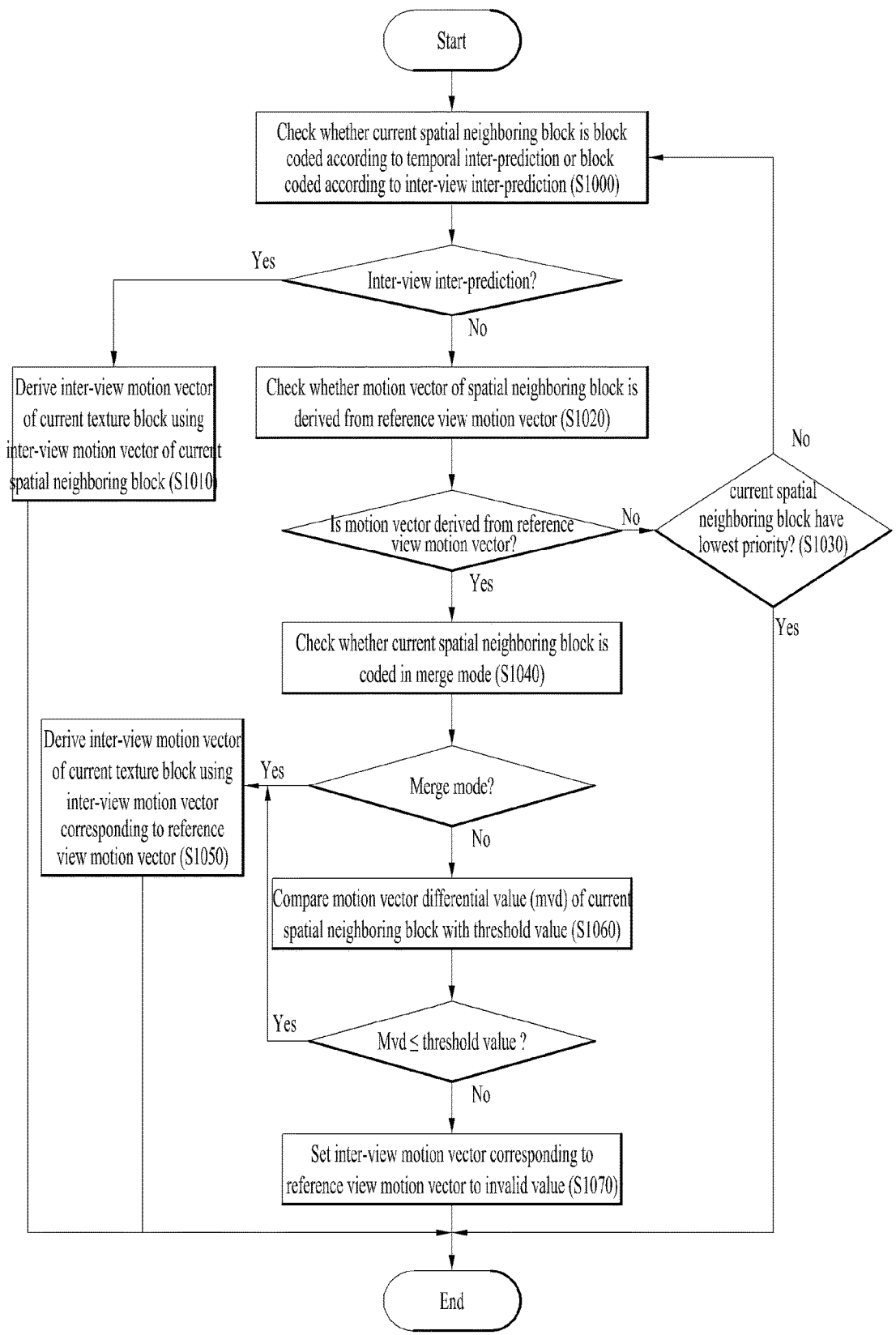
FIG. 10 is a flowchart illustrating a method of deriving an inter-view motion vector from a neighboring block coded according to temporal inter-prediction and a neighboring block coded according to inter-view inter-prediction on the basis of predetermined priority according to an embodiment to which the present invention is applied.

FIG. 10 is a flowchart illustrating a method of deriving an inter-view motion vector from a neighboring block coded according to temporal inter-prediction and a neighboring block coded according to inter-view inter-prediction on the basis of predetermined priorities according to an embodiment to which the present invention is applied.

Referring to FIG. 10, it may be checked whether spatial neighboring blocks are coded according to temporal inter-prediction or inter-view inter-prediction (S1000). It may be sequentially checked whether the spatial neighboring blocks are coded according to temporal inter-prediction or inter-view inter-prediction according to priorities of the spatial neighboring blocks. The checking process may be performed until a block coded according to temporal or inter-view inter-prediction is detected. When a spatial neighboring block coded according to inter-view inter-prediction is detected, the inter-view motion vector of the current texture block may be derived using the inter-view motion vector of the corresponding spatial neighboring block (S1010). When a spatial neighboring block coded according to temporal inter-prediction is detected, it may be checked whether the motion vector of the spatial neighboring block has been derived from a reference view motion vector (S1020). When the motion vector of the spatial neighboring block has not been derived from a reference view motion vector, it may be checked whether the spatial neighboring block has lowest priority (S1030). When the spatial neighboring block does not have the lowest priority, it is checked whether a spatial neighboring block having the next priority is a block coded according to temporal inter-prediction or a block coded according to inter-view inter-prediction (S1000). On the contrary, when the corresponding spatial neighboring block has the lowest priority, an inter-view motion vector cannot be derived from a spatial neighboring block any more and thus a process of deriving an inter-view motion vector from a temporal neighboring block or a disparity block according to priorities is performed.

When the motion vector of the corresponding spatial neighboring block has been derived from a reference view motion vector in step S1020, it may be checked whether the spatial neighboring block has been coded in the merge mode (S1040). It is possible to determine whether the spatial neighboring block has been coded in the merge mode on the basis of merge mode flag information of the spatial neighboring block. When the spatial neighboring block has been coded in the merge mode in step S1040, the inter-view motion vector of the current texture block may be derived using an inter-view motion vector corresponding to the reference view motion vector (S1050). However, when the spatial neighboring block has not been coded in the merge mode, a motion vector differential value of the spatial neighboring block may be compared with a threshold value (S1060). Here, the threshold value may be set to a predetermined integer. For example, a threshold value of a vertical component can be set to 2 pixels and a threshold value of a horizontal component can be set to 2 pixels. When the motion vector differential value is less than the threshold value in step S1060, the inter-view motion vector of the current texture block may be derived from an inter-view motion vector corresponding to the reference view motion vector of the spatial neighboring block (S1050). However, when the motion vector differential value is greater than the threshold value, this may mean that the reference view motion vector of the spatial neighboring block has a large error. In this case, the inter-view motion vector corresponding to the reference view motion vector may be set to an invalid value (S1070).

The present invention is not limited to use of one predetermined priority and may define a plurality of priority tables as shown in Table 4 and selectively use the priority tables.

TABLE 4

| Priority table index | Priority table type |
|---|---|
| 0 | Table in which a spatial inter-view motion vector has highest priority |
| 1 | Table in which a temporal inter-view motion vector has highest priority |
| 2 | Table in which a disparity vector has highest priority |

A description will be given of a method of selectively using one of the plurality of priority tables.

In one embodiment, the encoder may select a priority table with highest efficiency, code a priority table index corresponding to the selected priority table and transmit the priority table index to the decoder. Accordingly, the decoder may extract the priority table index from a received bitstream and select the priority table corresponding to the priority table index.

Alternatively, a priority table may be selected in consideration of an inter-view motion vector used by a block coded prior to the current texture block, which will now be described with reference to FIGS. 11 and 12.

Figure 11:
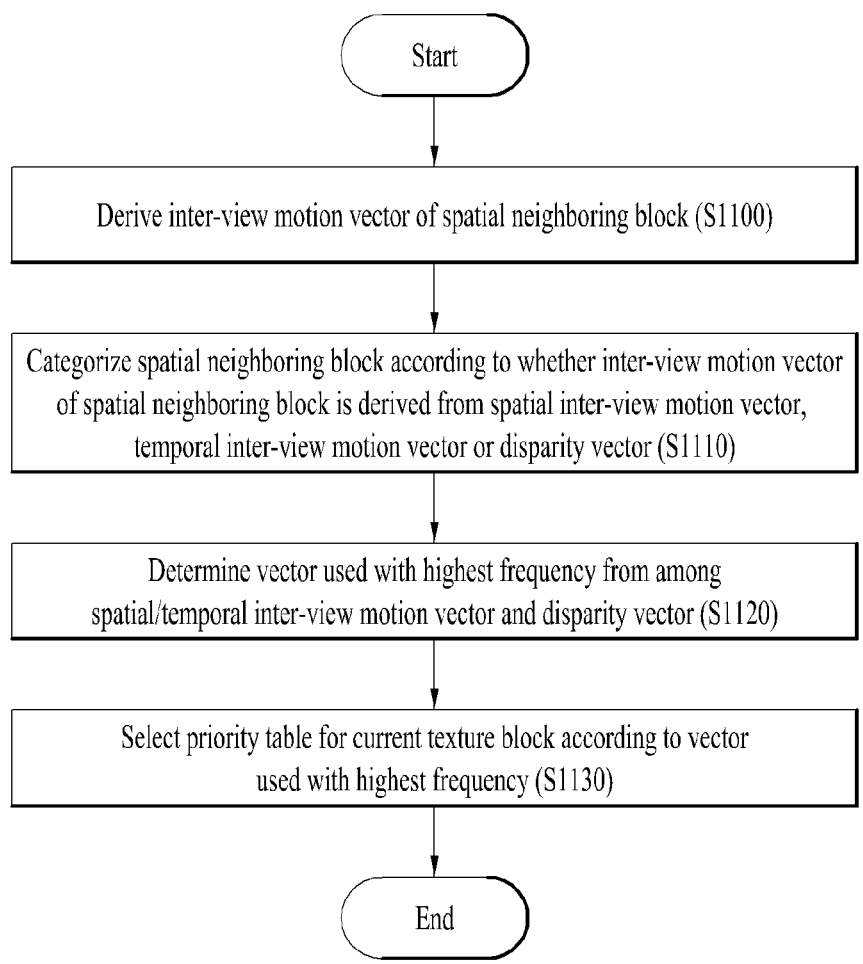
FIG. 11 is a flowchart illustrating a method of selecting a priority table in consideration of the frequencies of inter-view motion vectors used by spatial neighboring blocks according to an embodiment to which the present invention is applied.

FIG. 11 is a flowchart illustrating a method of selecting a priority table in consideration of the frequency of inter-view motion vectors used by spatial neighboring blocks according to an embodiment to which the present invention is applied.

Referring to FIG. 11, an inter-view motion vector of a spatial neighboring block may be derived (S1100). As described above, the inter-view motion vector of the spatial neighboring block may be derived through the method of deriving the inter-view motion vector of the current texture block. Accordingly, the inter-view motion vector of the spatial neighboring block may be derived from one of a spatial inter-view motion vector, a temporal inter-view motion vector and a disparity vector. Then, the spatial neighboring block may be categorized according to whether the inter-view motion vector of the spatial neighboring block is derived from the spatial inter-view motion vector, temporal inter-view motion vector or disparity vector (S1110). It is possible to determine a vector used with highest frequency from among the spatial inter-view motion vector, temporal inter-view motion vector and disparity vector through the categorization process (S1120). A priority table for the current texture block may be selected according to the vector used with highest frequency (S1130). For example, when the spatial inter-view motion vector is used with highest frequency in deriving of inter-view motion vectors of spatial neighboring blocks, a priority table in which the spatial inter-view motion vector has highest priority may be selected for the current texture block. On the contrary, when the spatial inter-view motion vector is not used with highest frequency, a priority table in which the temporal inter-view motion vector has highest priority may be selected for the current texture block.

Figure 12:
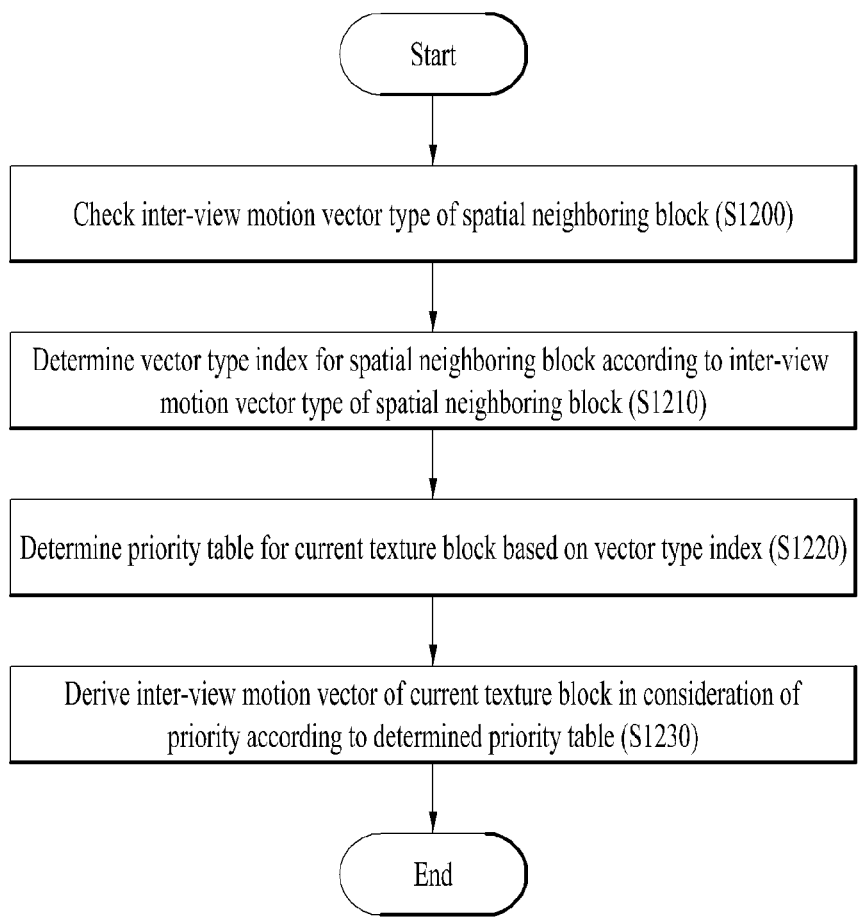
FIG. 12 is a flowchart illustrating a method of selecting a priority table in consideration of an inter-view motion vector type of a spatial neighboring block according to an embodiment to which the present invention is applied.

FIG. 12 is a flowchart illustrating a method of selecting a priority table in consideration of an inter-view motion vector type of a spatial neighboring block according to an embodiment to which the present invention is applied.

Referring to FIG. 12, an inter-view motion vector type of a spatial neighboring block may be checked (S1200). In other words, it may be checked whether the inter-view motion vector of the spatial neighboring block is derived from a spatial inter-view motion vector, a temporal inter-view motion vector or a disparity vector. A vector type index for the spatial neighboring block may be determined based on the inter-view motion vector type of the spatial neighboring block (S1210). The vector type index may be information which indicates whether the inter-view motion vector of the spatial neighboring block is derived from a spatial inter-view motion vector, a temporal inter-view motion vector or a disparity vector. For example, the vector type index for the spatial neighboring block can be determined as 0 when the inter-view motion vector of the spatial neighboring block is derived from the spatial inter-view motion vector, as 1 when the inter-view motion vector of the spatial neighboring block is derived from the temporal inter-view motion vector and as 2 when the inter-view motion vector of the spatial neighboring block is derived from the disparity vector. A priority table for the current texture block may be determined on the basis of the vector type index of the spatial neighboring block (S1220). For example, vector type indexes of spatial neighboring blocks and tables with priority table indexes corresponding to the vector type indexes can be used. While only left blocks and upper blocks are exemplified as spatial neighboring blocks in Table 5 for convenience, the present invention is not limited thereto and the priority table indexes are based on Table 4.

TABLE 5

| Vector type index | | |
|---|---|---|
| Left neighboring block | Upper neighboring block | Priority table index |
| 0 | 0 | 0 |
| 0 | 1 | 0 |
| 0 | 2 | 0 |
| 1 | 0 | 0 |
| 1 | 1 | 1 |
| 1 | 2 | 2 |
| 2 | 0 | 0 |
| 2 | 1 | 2 |
| 2 | 2 | 2 |

When an inter-view motion vector of a left neighboring block from among spatial neighboring blocks is derived from a spatial inter-view motion vector, the vector type index for the left neighboring block may be determined as 0. When an inter-view motion vector of an upper neighboring block is derived from a spatial inter-view motion vector, the vector type index for the upper neighboring block may be determined as 0. Referring to Table 5, when the vector types of the left neighboring block and the upper neighboring block are 0, the priority table index corresponding to the current texture block is determined as 0. Accordingly, a table in which the spatial inter-view motion vector has highest priority may be used for the current texture block.

When the inter-view motion vector of the left neighboring block is derived from a disparity vector, the vector type index for the left neighboring block may be determined as 2. When the inter-view motion vector of the upper neighboring block is derived from a temporal inter-view motion vector, the vector type index for the upper neighboring block may be determined as 1. In this case, the priority table index corresponding to the current texture block is determined as 2. That is, a table in which the disparity vector has highest priority may be used for the current texture block.

The inter-view motion vector of the current texture block may be derived in consideration of priority depending on the priority table determined in S1220 (S1230).

Figure 13:
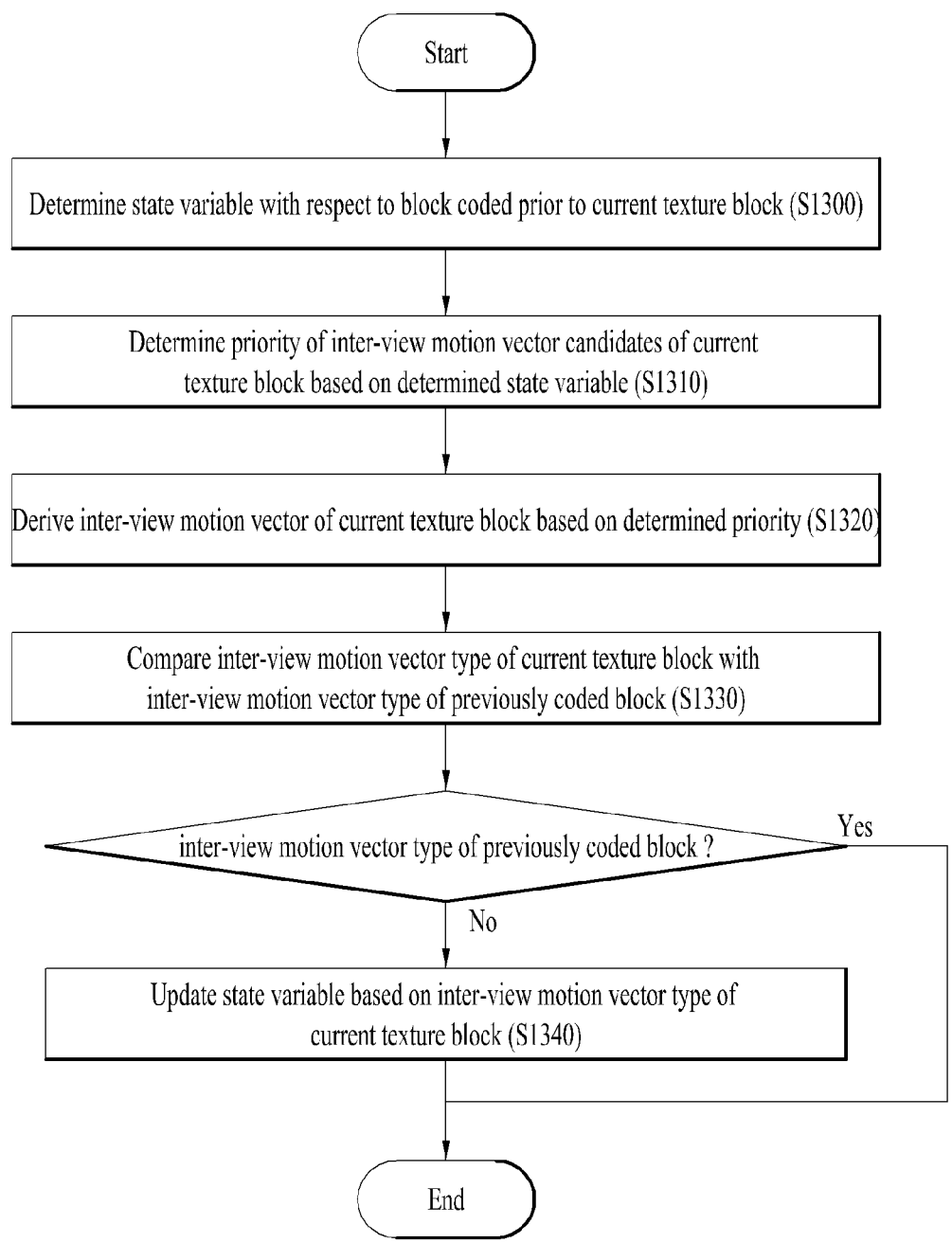
FIG. 13 is a flowchart illustrating a method of determining priority using a state variable according to an embodiment to which the present invention is applied.

FIG. 13 is a flowchart illustrating a method of determining priority using a state variable according to an embodiment to which the present invention is applied.

Referring to FIG. 13, a state variable with respect to a block coded prior to the current texture block may be determined (S1300). Here, the state variable may refer to a variable which indicates whether the inter-view motion vector of the block coded prior to the current texture block is derived from a spatial inter-view motion vector or a temporal inter-view motion vector. For example, the state variable of the block coded prior to the current texture block can be set to 0 when the inter-view motion vector of the block is derived from an inter-view motion vector of a spatial neighboring block and to 1 when the inter-view motion vector of the block is derived from an inter-view motion vector of a temporal neighboring block. On the contrary, the state variable of the block coded prior to the current texture block can be set to 1 when the inter-view motion vector of the block is derived from an inter-view motion vector of a spatial neighboring block and to 0 when the inter-view motion vector of the block is derived from an inter-view motion vector of a temporal neighboring block.

Priorities of inter-view motion vector candidates of the current texture block may be determined on the basis of the determined state variable of the block coded prior to the current texture block (S1310). For example, when the state variable of the block is set to a value indicating that the inter-view motion vector of the block is derived from a spatial inter-view motion vector, the spatial inter-view motion vector from among the inter-view motion vector candidates of the current texture block can be given high priority. On the contrary, when the state variable of the block is set to a value indicating that the inter-view motion vector of the block is derived from a temporal inter-view motion vector, the temporal inter-view motion vector can be given high priority. Alternatively, when a plurality of priority tables is defined, as shown in Table 4, priorities of inter-view motion vector candidates may be determined using state variables and tables with priority table indexes corresponding to the state variables, as shown in Table 6.

TABLE 6

| State variable | Priority table index | Priority table type |
| --- | --- | --- |
| 0 | 0 | Table in which a spatial inter-view motion vector has highest priority |
| 1 | 1 | Table in which a temporal inter-view motion vector has highest priority |

Referring to Table 6, when the state variable of the block coded prior to the current texture block is 0, in other words, when the inter-view motion vector of the block coded prior to the current texture block is derived from the spatial inter-view motion vector, the priority table index of the current texture block may be determined as 0 and thus a table in which the spatial inter-view motion vector has highest priority may be used for the current texture block. On the contrary, when the state variable of the block coded prior to the current texture block is 1, the priority table index of the current texture block may be determined as 1 and thus a table in which the temporal inter-view motion vector has highest priority may be used for the current texture block.

The inter-view motion vector of the current texture block may be derived on the basis of the determined priority (S1320). The state variable of the current texture block may be used to determine a priority of the next block to be coded. Accordingly, the state variable of the current texture block needs to be updated on the basis of the inter-view motion vector derived in S1320. To this end, the inter-view motion vector type of the current texture block may be compared with the inter-view motion vector type of the previously coded block (S1330). For example, when the state variable of the previously coded block is set to 0 as the inter-view motion vector thereof is derived from the spatial inter-view motion vector and thus the spatial inter-view motion vector from among inter-view motion vector candidates of the current texture block is given a high priority, it is checked whether the spatial neighboring block having highest priority has an inter-view motion vector for the current texture block, and thus the inter-view motion vector of the current texture block may be derived from the inter-view motion vector of the spatial neighboring block. In this case, the inter-view motion vector type of the current texture block may be regarded as identical to the inter-view motion vector type of the previously coded block. However, when it is determined that the spatial neighboring block cannot be used, it is checked whether a candidate with next highest priority (e.g. temporal neighboring block) has an inter-view motion vector for the current texture block and the inter-view motion vector of the current texture block may be derived from the inter-view motion vector of the candidate with the next highest priority. In this case, the inter-view motion vector type of the current texture block may be regarded as differing from the inter-view motion vector type of the candidate. When it is determined that the inter-view motion vector type of the current texture block differs from that of the previously coded block in S1330, the state variable may be updated on the basis of the inter-view motion vector type of the current texture block, which is derived in S1320 (S1340). For example, when the inter-view motion vector of the current texture block is derived from the temporal inter-view motion vector though the state variable of the previously coded block is set to 0 as the inter-view motion vector of the previously coded block is derived from the spatial inter-view motion vector, the state variable can be updated to 1. When the current texture block and the previously coded block have the same inter-view motion vector type, the state variable of the previously coded block may be maintained.

The inter-view motion vector of the current texture block may be derived using a statistical function having the aforementioned inter-view motion vector candidates as inputs. For example, the inter-view motion vector of the current texture block can be derived from a median value, a mode value and a mean value of the inter-view motion vector candidates. Here, candidates applied to the statistical function may include the spatial inter-view motion vector, the temporal inter-view motion vector and the disparity vector. Alternatively, inter-view motion vectors may be searched according to priority for each category and only the inter-view motion vector acquired first may be used as an input of the statistical function. Furthermore, only candidates belonging to a specific category may be used. For example, only candidates belonging to a combination of specific categories, such as a) spatial inter-view motion vector and temporal inter-view motion vector, b) spatial inter-view motion vector and disparity vector and c) temporal inter-view motion vector and disparity vector, can be used as inputs of the statistical function.

Two or more inter-view motion vectors may be derived for one current texture block. That is, two or more inter-view motion vectors may be determined from among inter-view motion vector candidates and included in a motion vector list to be used when the motion vector of the current texture block is derived. A method of deriving a plurality of inter-view motion vectors is described. At least one inter-view motion vector may be acquired per category. For example, at least one inter-view motion vector can be acquired from a spatial neighboring block and at least one inter-view motion vector can be acquired from a temporal neighboring block. Alternatively, a spatial neighboring block may be divided into a first group including a left lower neighboring block and a left neighboring block and a second group including a right upper neighboring block, an upper neighboring block and a left upper neighboring block and an inter-view motion vector may be acquired per group. Furthermore, an inter-view motion vector may be acquired per group according to a predetermined priority and the inter-view motion vector acquired first may be set to an inter-view motion vector representative value of each group.

When a plurality of inter-view motion vectors is derived, inter-view motion vectors having the same value may be present. Accordingly, a process of removing a redundant inter-view motion vector may be performed when acquired inter-view motion vectors are added to the motion vector list of the current texture block.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

As described above, the decoding/encoding device to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code video signals.
The invention claimed is:
1. A method for decoding a video signal by a decoding apparatus, the method comprising:
  deriving, by the decoding apparatus, an inter-view motion vector of a current texture block by searching inter-view motion vector candidates in an order of an inter-view motion vector of a temporal neighboring block of the current texture block, an inter-view motion vector of a spatial neighboring block of the current texture block, and a disparity vector derived by the decoding apparatus using depth data of a depth block; and
  performing, by the decoding apparatus, inter-view inter-prediction for the current texture block using the derived inter-view motion vector of the current texture block,
  wherein deriving the inter-view motion vector of the current texture block includes:
  determining, by the decoding apparatus, whether the temporal neighboring block of the current texture block is coded using inter-view inter-prediction, wherein the inter-view motion vector of the temporal neighboring block is derived as the inter-view motion vector of the current texture block when the temporal neighboring block is coded using inter-view inter-prediction,
  determining, by the decoding apparatus, whether the spatial neighboring block of the current texture block is coded using inter-view inter-prediction, wherein the inter-view motion vector of the spatial neighboring block is derived as the inter-view motion vector of the current texture block when the temporal neighboring block is not coded using inter-view inter-prediction and the spatial neighboring block is coded using inter-view inter-prediction, and
  deriving, by the decoding apparatus, the disparity vector as the inter-view motion vector of the current texture block when the temporal neighboring block of the current texture block and the spatial neighboring block of the current texture block are not coded using inter-view inter-prediction.

2. The method according to claim 1, wherein the spatial neighboring block includes at least one of a left lower neighboring block, a left neighboring block, a right upper neighboring block, an upper neighboring block, and a left upper neighboring block of the current texture block.

3. The method according to claim 2, wherein whether the spatial neighboring block is coded using inter-view inter-prediction is determined in an order of the left neighboring block and the upper neighboring block.

4. The method according to claim 1, wherein the temporal neighboring block includes at least one of a collocated block, a block adjacent to the collocated block, and a coding block including the collocated block.

5. The method according to claim 4, wherein whether the temporal neighboring block is coded using inter-view inter-prediction is determined in an order of the collocated block, the block adjacent to the collocated block, and the coding block including the collocated block.

6. The method according to claim 1, wherein whether the temporal neighboring block of the current texture block is coded using inter-view inter-prediction is determined by comparing a reference index of the temporal neighboring block with the a reference index of a reference picture of the temporal neighboring block.

7. The method according to claim 1, wherein whether the spatial neighboring block of the current block is coded using inter-view inter-prediction is determined by comparing a picture order count of the spatial neighboring block with a picture order count of a reference picture of the spatial neighboring block.

8. An apparatus for decoding a video signal, comprising:
  a decoded picture buffer; and
  an inter-prediction unit coupled to the decoded picture buffer and configured to derive an inter-view motion vector of a current texture block by searching inter-view motion vector candidates in an order of an inter-view motion vector of a spatial neighboring block of the current texture block, an inter-view motion vector of a temporal neighboring block of the current texture block, and a disparity vector derived by the decoding apparatus using depth data of a depth block and to perform inter-view inter-prediction for the current texture block using the derived inter-view motion vector of the current texture block, wherein deriving the inter-view motion vector of the current texture block includes:

determining, by the decoding apparatus, whether the temporal neighboring block of the current texture block is coded using inter-view inter-prediction, wherein the inter-view motion vector of the temporal neighboring block is derived as the inter-view motion vector of the current texture block when the temporal neighboring block is coded using inter-view inter-prediction, determining, by the decoding apparatus, whether the spatial neighboring block of the current texture block is coded using inter-view inter-prediction, wherein the inter-view motion vector of the spatial neighboring block is derived as the inter-view motion vector of the current texture block when the temporal neighboring block is not coded using inter-view inter-prediction and the spatial neighboring block is coded using inter-view inter-prediction, and deriving, by the decoding apparatus, the disparity vector as the inter-view motion vector of the current texture block when the temporal neighboring block of the current texture block and the spatial neighboring block of the current texture block are not coded using inter-view inter-prediction.

9. The apparatus according to claim 8, wherein the spatial neighboring block includes at least one of a left lower neighboring block, a left neighboring block, a right upper neighboring block, an upper neighboring block, and a left upper neighboring block of the current texture block.

10. The apparatus according to claim 9, wherein whether the spatial neighboring block is coded using inter-view inter-prediction is determined in an order of the left neighboring block and the upper neighboring block.

11. The apparatus according to claim 8, wherein the temporal neighboring block includes at least one of a collocated block, a block adjacent to the collocated block, and a coding block including the collocated block.

12. The apparatus according to claim 11, wherein whether the temporal neighboring block is coded using inter-view inter-prediction is determined in an order of the collocated block, the block adjacent to the collocated block, and the coding block including the collocated block.

13. The apparatus according to claim 8, wherein whether the temporal neighboring block of the current texture block is coded using inter-view inter-prediction is determined by comparing a reference index of the temporal neighboring block with the a reference index of a reference picture of the temporal neighboring block.

14. The apparatus according to claim 8, wherein whether the spatial neighboring block of the current block is coded using inter-view inter-prediction is determined by comparing a picture order count of the spatial neighboring block with a picture order count of a reference picture of the spatial neighboring block.

* * * * *